(12) United States Patent
Hornstein et al.

(10) Patent No.: US 11,449,004 B2
(45) Date of Patent: Sep. 20, 2022

(54) SYSTEM AND METHOD FOR HOLOGRAPHIC IMAGE DISPLAY

(71) Applicant: Looking Glass Factory, Inc., Brooklyn, NY (US)

(72) Inventors: Alexis Hornstein, Brooklyn, NY (US); Kyle Appelgate, Brooklyn, NY (US); Lee Shiu Pong, Brooklyn, NY (US); Shi Yun Liu, Brooklyn, NY (US); Shawn Michael Frayne, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/326,857

(22) Filed: May 21, 2021

(65) Prior Publication Data
US 2021/0364988 A1    Nov. 25, 2021

Related U.S. Application Data

(60) Provisional application No. 63/053,334, filed on Jul. 17, 2020, provisional application No. 63/028,344, filed on May 21, 2020.

(51) Int. Cl.
*G03H 1/22* (2006.01)
*H04N 13/376* (2018.01)
(Continued)

(52) U.S. Cl.
CPC ......... *G03H 1/2249* (2013.01); *G03H 1/0005* (2013.01); *H04N 13/368* (2018.05);
(Continued)

(58) Field of Classification Search
CPC .............. G03H 1/2249; G03H 1/0005; G03H 2001/2273; G03H 2001/0088; H04N 13/376; H04N 13/368
(Continued)

(56) References Cited

U.S. PATENT DOCUMENTS 2,631,496 A    3/1953 Rehorn
5,264,964 A    11/1993 Faris
(Continued)

FOREIGN PATENT DOCUMENTS

CN    103852819 A    6/2014
CN    106125322 A    11/2016
(Continued)

OTHER PUBLICATIONS

Broxton, Michael, et al., "Immersive Light Field Video with a Layered Mesh Representation", SIGGRAPH 2020 Technical Paper.
(Continued)

*Primary Examiner* — Tung T Vo
(74) *Attorney, Agent, or Firm* — Jeffrey Schox; Randy Mehlenbacher

(57) ABSTRACT

A holographic display and method for operating the holographic display can include: a holographic display operable in a plurality of modes, a computing system, and a sensor. The holographic display can option include a user interface device. Views displayed by the display can optionally be processed or modified based on a viewer pose relative to the display.

21 Claims, 16 Drawing Sheets

(51) Int. Cl.
  *G03H 1/00* (2006.01)
  *H04N 13/368* (2018.01)
(52) U.S. Cl.
  CPC ... *H04N 13/376* (2018.05); *G03H 2001/0088* (2013.01); *G03H 2001/2273* (2013.01)
(58) Field of Classification Search
  USPC .......................................................... 348/51
  See application file for complete search history.

(56) References Cited

U.S. PATENT DOCUMENTS

| | | | |
|---|---|---|---|
| 5,629,798 | A | 5/1997 | Gaudreau |
| 5,875,055 | A | 2/1999 | Morishima et al. |
| 5,886,675 | A * | 3/1999 | Aye ........................ G09G 3/002 345/7 |
| 6,064,424 | A | 5/2000 | Van et al. |
| 6,097,394 | A | 8/2000 | Levoy et al. |
| 6,195,184 | B1 | 2/2001 | Chao et al. |
| 6,304,288 | B1 | 10/2001 | Hamagishi |
| 6,462,871 | B1 | 10/2002 | Morishima |
| 6,798,390 | B1 | 9/2004 | Sudo et al. |
| 7,190,518 | B1 | 3/2007 | Kleinberger et al. |
| 7,705,935 | B2 | 4/2010 | Gaudreau |
| 7,903,332 | B2 | 3/2011 | De et al. |
| 8,248,694 | B2 | 8/2012 | Sugiyama |
| 8,416,276 | B2 | 4/2013 | Kroll et al. |
| 9,479,767 | B2 | 10/2016 | Van Der Horst |
| 9,486,386 | B2 | 11/2016 | Bathiche et al. |
| 9,584,797 | B2 | 2/2017 | Hyde et al. |
| 9,654,768 | B2 | 5/2017 | Qin et al. |
| 9,686,535 | B2 | 6/2017 | Hamagishi et al. |
| 9,704,220 | B1 | 7/2017 | Bakar et al. |
| 10,152,154 | B2 | 12/2018 | Chen |
| 10,551,913 | B2 | 2/2020 | McCombe et al. |
| 10,853,625 | B2 | 12/2020 | McCombe et al. |
| 10,904,479 | B2 | 1/2021 | Karafin et al. |
| 10,924,817 | B2 | 2/2021 | Defaria et al. |
| 2004/0165262 | A1 | 8/2004 | Alejo |
| 2005/0078370 | A1 | 4/2005 | Nishihara et al. |
| 2005/0117016 | A1 * | 6/2005 | Surman .................. H04N 13/32 348/51 |
| 2006/0061651 | A1 | 3/2006 | Tetterington |
| 2007/0091058 | A1 | 4/2007 | Nam et al. |
| 2007/0164950 | A1 | 7/2007 | Tajiri |
| 2007/0165145 | A1 | 7/2007 | Sugiyama |
| 2009/0224646 | A1 | 9/2009 | Kim et al. |
| 2010/0302351 | A1 | 12/2010 | Yanamoto |
| 2011/0032346 | A1 | 2/2011 | Kleinberger |
| 2011/0075257 | A1 | 3/2011 | Hua et al. |
| 2011/0102558 | A1 | 5/2011 | Moliton et al. |
| 2011/0193863 | A1 * | 8/2011 | Gremse ................ H04N 13/351 345/419 |
| 2011/0316987 | A1 * | 12/2011 | Komoriya ............ H04N 13/351 348/51 |
| 2012/0313896 | A1 | 12/2012 | Noda |
| 2013/0088486 | A1 | 4/2013 | Yoon et al. |
| 2013/0257861 | A1 | 10/2013 | Kim et al. |
| 2013/0307948 | A1 * | 11/2013 | Odake .................. H04N 13/368 348/59 |
| 2014/0118511 | A1 | 5/2014 | Hyde et al. |
| 2014/0267584 | A1 | 9/2014 | Atzpadin et al. |
| 2014/0320614 | A1 | 10/2014 | Gaudreau |
| 2014/0347454 | A1 | 11/2014 | Qin et al. |
| 2015/0022887 | A1 | 1/2015 | Larson et al. |
| 2016/0021365 | A1 | 1/2016 | Effendi et al. |
| 2016/0101013 | A1 | 4/2016 | Bathiche et al. |
| 2016/0234487 | A1 | 8/2016 | Kroon et al. |
| 2016/0313842 | A1 * | 10/2016 | Pacheco ................ G06F 3/0426 |
| 2017/0041596 | A1 * | 2/2017 | Park ..................... H04N 13/307 |
| 2017/0078650 | A1 | 3/2017 | Frayne et al. |
| 2017/0139213 | A1 | 5/2017 | Schmidtlin |
| 2017/0208292 | A1 | 7/2017 | Smits |
| 2017/0347083 | A1 | 11/2017 | Grossmann |
| 2018/0035096 | A1 | 2/2018 | Gemayel |
| 2018/0084245 | A1 | 3/2018 | Lapstun |
| 2019/0035125 | A1 | 1/2019 | Bellows et al. |
| 2019/0049899 | A1 | 2/2019 | Gelman et al. |
| 2019/0088004 | A1 | 3/2019 | Lucas et al. |
| 2020/0228881 | A1 | 7/2020 | Defaria et al. |
| 2020/0266252 | A1 | 8/2020 | Cancel Olmo et al. |
| 2020/0296327 | A1 * | 9/2020 | Karafin ................ G03H 1/2286 |
| 2020/0314415 | A1 * | 10/2020 | Karafin ................ H04N 13/363 |
| 2020/0384371 | A1 * | 12/2020 | Karafin ................... A63J 13/00 |
| 2021/0044795 | A1 * | 2/2021 | Karafin ................ G03H 1/0005 |
| 2021/0060405 | A1 * | 3/2021 | Karafin .................. G02B 30/56 |
| 2021/0132693 | A1 * | 5/2021 | Pulli ....................... G02B 30/31 |
| 2021/0165212 | A1 * | 6/2021 | Christmas .......... G02B 27/0081 |

FOREIGN PATENT DOCUMENTS

| | | |
|---|---|---|
| DE | 102009009443 B3 | 9/2010 |
| JP | 3096613 B2 | 12/1996 |
| JP | 2010068202 A | 3/2010 |
| KR | 20140111553 A | 9/2014 |
| WO | 9827451 A1 | 6/1998 |
| WO | 2006015562 A1 | 2/2006 |
| WO | 2015104239 A2 | 7/2015 |
| WO | 2018227098 A1 | 12/2018 |

OTHER PUBLICATIONS

Gotsch, Dan, et al., "TeleHuman2: A Cylindrical Light Field Teleconferencing System for Life-size 3D Human Telepresence", CHI 2018, Apr. 21-26, 2018, Montreal, QC, Canada.

Huzaifa, Muhammad, et al., "Exploring Extended Reality with ILLIXR: A New Playground for Architecture Research", arXiv:2004.04643v2, Mar. 3, 2021.

Kim, Kibum, et al., "TeleHum: Effects of 3D Perspective on Gaze and Pose Estimation with a Life-size Cylindrical Telepresence Pod", CHI 2021, May 5-10, 2021, Austin, Texas, USA.

Levoy, Marc, et al., "Light Field Rendering", ACM-0-89791-746-4/96/008, 1996.

Vertegaal, Roel, "Real Reality Interfaces with Interactive Light Field Displays", IMID 2018 Digest.

Zhang, Xujing, et al., "LightBee:A Self-Levitating Light Field Display for Hologrammatic Telepresence", CHI 2019, May 4-9, 2019, Glasgow, Scotland, UK.

International Search Report and the Written Opinion, Application No. PCT/US19/015235, dated Apr. 4, 2019.

An, Jungkwuen, et al., "Slim-panel holographic video display", Nature Communications vol. 11, Article No. 5568 (2020), published Nov. 10, 2020.

Chen, Renjie, et al., "Wide field view compressive light field display using a multilayer architecture and tracked viewers", Journal of the SID 22/10, 2015, pp. 525-534.

Dodgson, Neil Anthony, "Variation and extrema of human interpupillary distance", Proceedings of SPIE—The International Society for Optical Engineering, 5291:36-46, Jan. 2004.

Hayashi, Akinori, et al., "A 23-in. full-panel-resolution autostereoscopic LCD with a novel directional backlight system", Journal of the Society for Information Display 18(7), Jul. 2010.

Holliman, Nick, "3D Display Systems", Science Laboratories, Feb. 2, 2005.

Jung, Sung-Min, et al., "High image quality 3D displays with polarizer glasses based on active retarder technology", Proceedings of SPIE—The International Society for Optical Engineering, vol. 7863,Feb. 2011.

Kleinberger, Paul, et al., "A full-time, full-resolution dual stereoscopic/autostereoscopic display OR Rock Solid 3D on a flat screen—with glasses or without!", Conference: Electronic Imaging 2003, Proceedings of SPIE—The International Society for Optical Engineering, May 2003.

McAllister, David Franklin, "Display Technology: Stereo & 3D Display Technologies", Department of Computer Science, North Carolina State University, Mar. 2003.

Peterka, Tom, et al., "Advances in the Dynallax Solid-State Dynamic Parallax Barrier Autostereoscopic Visualization Display System", IEEE Transactions on Visualization and Computer Graphics 14(3):487-99, May 2008.

(56) References Cited

OTHER PUBLICATIONS

Stolle, Hagen, et al., "Technical solutions for a full-resolution autostereoscopic 2D/3D display technology", Proceedings of SPIE—The International Society for Optical Engineering, Mar. 2008.
Brar, Rajwinder Singh, et al., "Laser-Based Head-Tracked 3D Display Research", Journal of display technology, IEEE Service center, NY, US, vol. 6, No. 10, Oct. 1, 2010, pp. 531-543, XP011308937, ISSN: 1551-319X.
Liou, Jian-Chiun, et al., "Dynamic LED backlight 2D/3D switchable autostereoscopic multi-view display", Journal of display technology, IEEE Service center, NY, US, vol. 10, No. 8, Aug. 1, 2014, pp. 629-634, XP0111551837, ISSN: 1551-319X, DOI: 10.1109/JDT.2014.2307691.
Urey, Hakan, et al., "State of the art in stereoscopic and autostereoscopic displays", Proceedings of the IEEE, IEEE. New York, US, vol. 99, No. 4, Apr. 1, 2011 (Apr. 1, 2011), pp. 540-555. XP011363625, ISSN: 0018-9219, D0I: 10.1109/JPROC. 2010.2098351.
"ELFSR1 Spatial Reality Display", https://electronics.sony.eom/spatial-reality-display/p/elfsr1, downloaded on May 5, 2020.
"We developed the World's Most Advanced 3D Display Technology", https://www.dimenco.eu, downloaded Mar. 5, 2020.

\* cited by examiner

Unbounded viewer mode

Bounded viewer mode

Transition out of bounded viewer mode

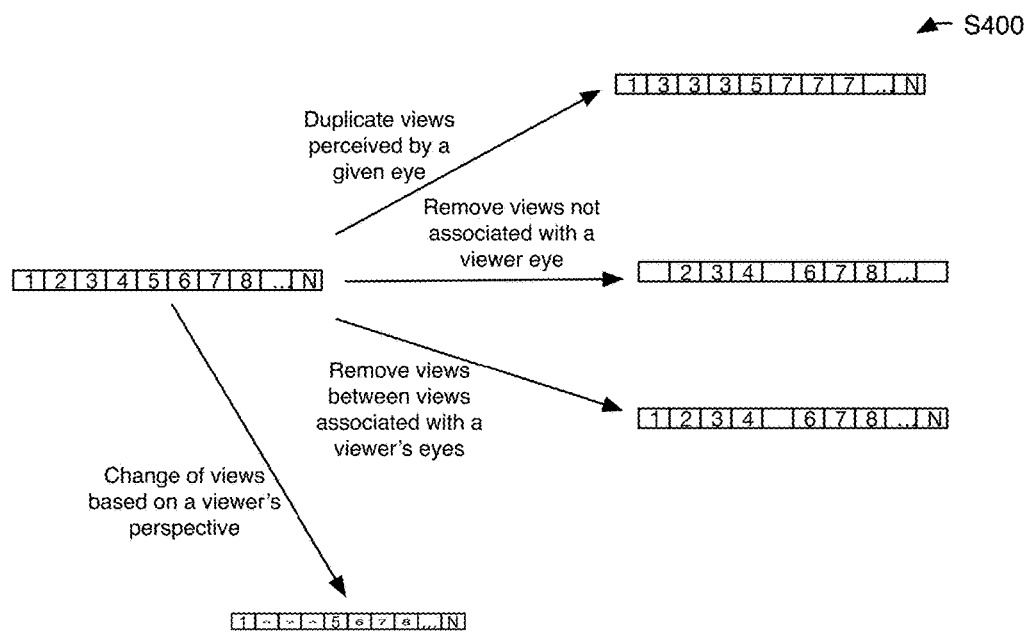
FIGURE 17
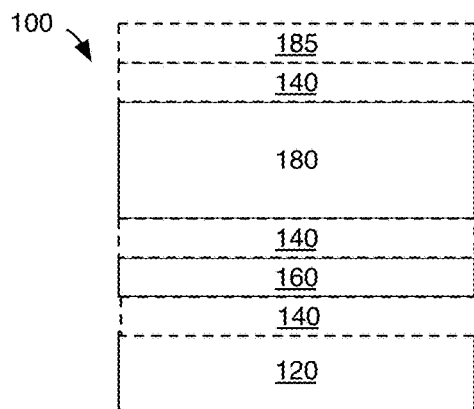
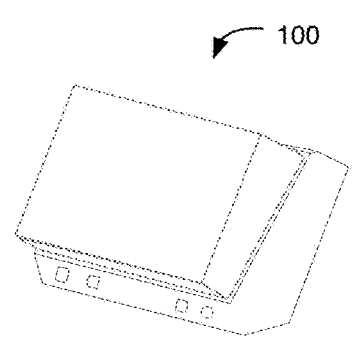
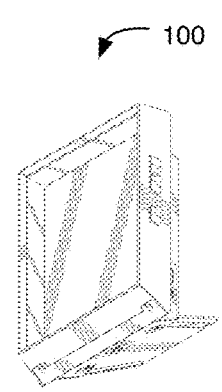
Figure 18A      Figure 18B      Figure 18C

SYSTEM AND METHOD FOR HOLOGRAPHIC IMAGE DISPLAY

CROSS-REFERENCE TO RELATED APPLICATIONS

This application claims the benefit of U.S. Provisional Application No. 63/028,344, filed 21-May-2020 and U.S. Provisional Application No. 63/053,334, filed 17-Jul.-2020, each of which is incorporated in its entirety by this reference.

TECHNICAL FIELD

This invention relates generally to the holographic display field, and more specifically to a new and useful system and method in the holographic display field.

BRIEF DESCRIPTION OF THE FIGURES

FIG. 17 is a schematic representation of examples of processing views including duplicating views associated with an eye of a viewer, removing views associated with positions between the eyes of a viewer, removing views not associated with an eye of a viewer, and adjusting a vertical parallax of views associated with an eye of a viewer.

FIGS. 18A, 18B, and 18C are schematic representations of examples of holographic displays.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
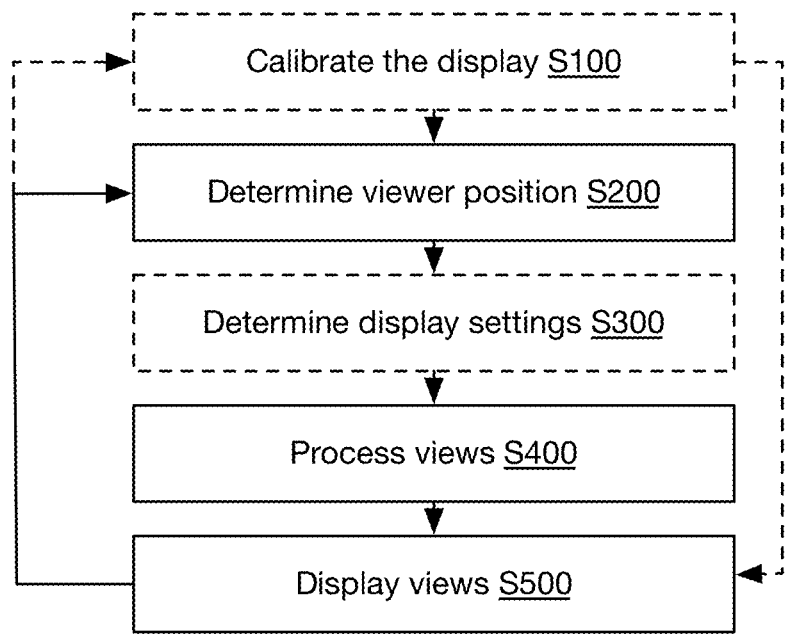
FIG. 1 is a schematic representation of the method.

As shown in FIG. 1, the method includes determining a viewer position S200, processing views S400, and displaying views S500. The method can optionally include calibrating a display S100, determining display settings S300, and/or any suitable components.

Figure 2:
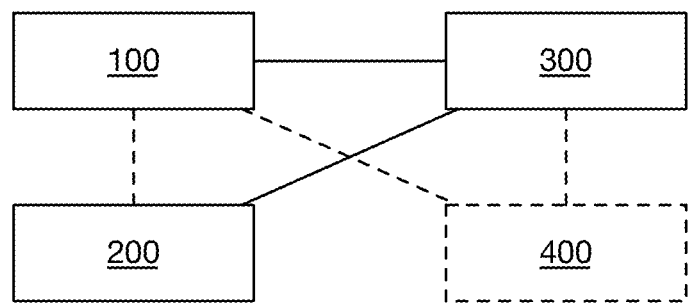
FIG. 2 is a schematic representation of the system.

As shown in FIG. 2, the system includes one or more: displays 100, sensors 200, and computing systems 300. The system can optionally include a user interface 400, and/or any suitable components.

The system and method function to track the positions of one or more users (e.g., viewers, view generators, etc.) and to display one or more views to the viewer(s). For example, the system and method can enable multiple views to be displayed to multiple viewers on a single display. The views can include still images (e.g., from different perspectives of the scene), light rays (e.g., corresponding to a plenoptic function, a photic field, etc. of a scene), and/or any suitable information.

In a first example, the method includes: determining the pose of a user target (e.g., eye, head, etc.) relative to the display; selecting a view from a view array based on the determined pose; optionally determining the user distance to the display; optionally determining view parameters based on the user distance and a set of calibration matrices; optionally determining which pixels and/or subpixels to use to display the view based on the view parameters; and rendering the view within a view cone at the display. View parameters can include: view cone extent, epipolar distance between left and right views, view resolution, or other parameters. In a specific example, view parameters are determined by interpolating between the convergent and orthographic calibrations based on the user distance. This example can be repeated for one or more users within a predetermined distance of the display, wherein each user can be associated with a separate and distinct view cone (e.g., wherein the view arc can be segmented into multiple overlapping or nonoverlapping view cones). The display can project no views or low-resolution views into the regions between different view cones. The display can optionally concurrently project a predetermined number of views adjacent the selected views (e.g., within the view array) to accommodate for rapid user motion. The display can optionally operate between one or more modes based on viewer parameters (e.g., number, kinematics, arrangement, etc.).

Figure 11:
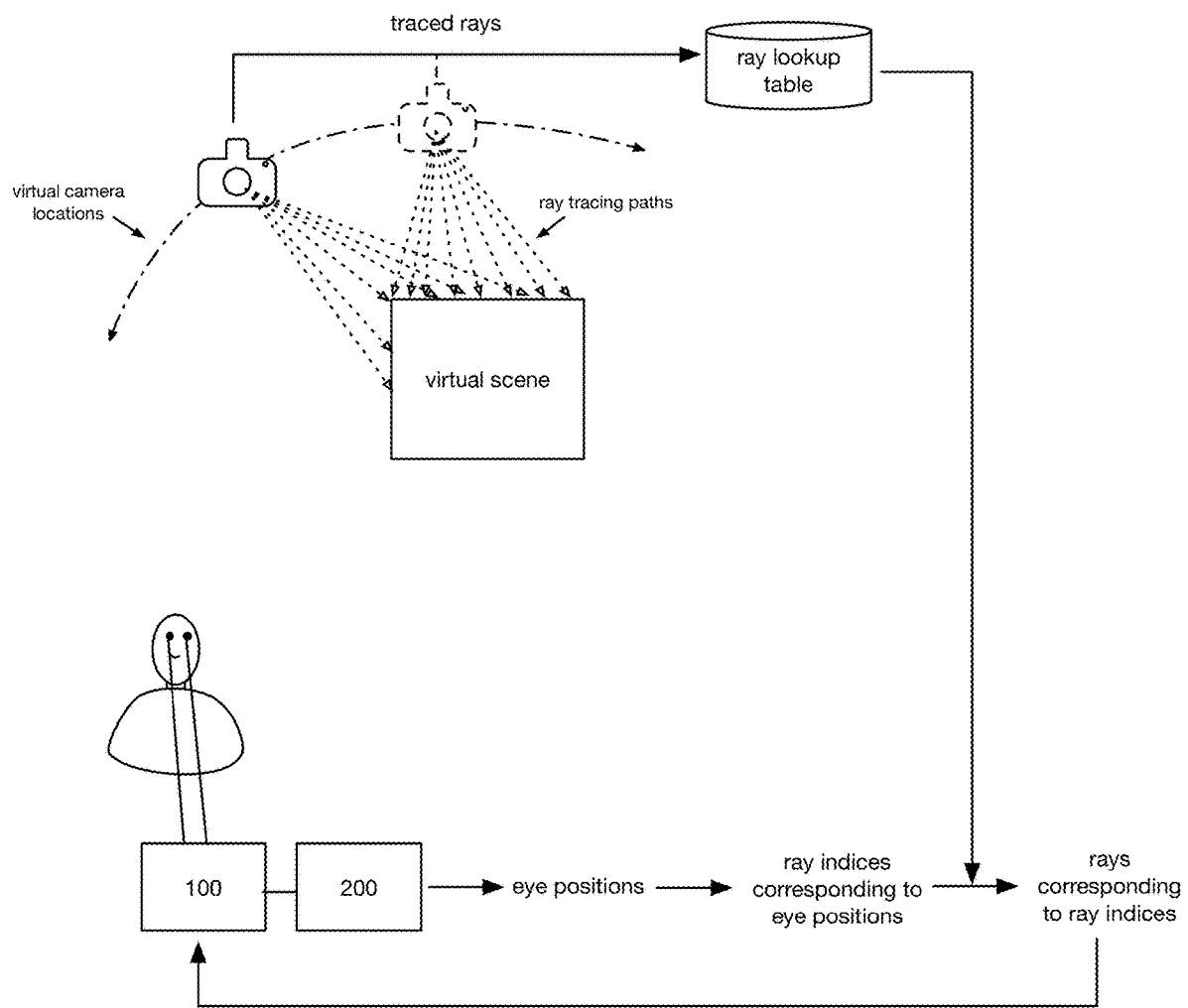
FIG. 11 is a schematic representation of an example of displaying rays based on eye position.

In a second example as shown in FIG. 11, the method includes: determining the pose of the user target; identifying a ray set associated with the pose; and displaying the identified ray set.

2. Benefits

Variations of the technology can confer several benefits and/or advantages.

First, variants of the technology can decrease and/or prevent one or more viewers from experiencing visual artifacts (e.g., crosstalk, blurring, distorting aspect ratios, etc.) while viewing images from a display (for example a display as described in U.S. Pat. No. 10,241,344 entitled 'ADVANCED RETROREFLECTING AERIAL DISPLAYS', filed on 28-Nov.-2018; U.S. patent application Ser. No. 16/374,955 entitled 'SUPERFREE-SPACE 3D DISPLAY WITH ENHANCED OFF-ANGLE SEPARATION,' filed on 24-Jul.-2018; U.S. patent application Ser. No. 29/760,569 entitled 'LIGHTFIELD DISPLAY,' filed on 02-Dec.-2020, each of which is incorporated in its entirety by this reference; a display as shown for example in FIGS. 18A-18C; etc.). In a specific example, calibrating the display can decrease the amount of and/or extent of visual artifacts observed by a viewer. In a second specific example, sending a limited number of views (e.g., 1 view, 2 views, 3 views, 5 views, etc.) to each eye of the viewer can decrease the viewer's perception of visual artifacts.

Second, variants of the technology can increase the achievable depth perception and/or view resolution for a user. In specific examples, transmitting a subset of views to a user (e.g., using a beam steering, by modifying the views, etc.) can enable the increased depth perception and/or view resolution. For instance, displaying fewer views on the display decreases crosstalk between views thereby increasing an apparent scene resolution.

Third, variants of the technology can accommodate for vertical perspective (e.g., vertical parallax) of one or more viewers. In a specific example, by knowing the location of one or more viewers (e.g., viewers' eyes, viewers' heads, etc.), views can be rendered based on the viewer position as opposed to being rendered at a fixed height and/or perspective.

Fourth, variants of the technology can decrease computational cost by lowering the resolution or not rendering views for regions between viewers.

However, variants of the technology can confer any other suitable benefits and/or advantages.

3. System

The system preferably functions to track one or more users and to display a set of views (e.g., based on the user tracking).

The set of views are preferably rendered from a virtual reconstruction of a scene. The virtual reconstruction can be generated from a set of images (e.g., taken from different perspectives), from a geometric sampling, and/or in any suitable manner. However, the set of views can correspond to a set of images captured of the scene, a virtual model of a scene, and/or to any suitable images. For example, different views within a set can be virtual images of the same virtual scene from different vantage points, wherein the vantage points (and associated views) can be indexed or uniquely identified within the set. The set of views can be fixed (e.g., rendered at a fixed height, rendered a single time, fixed number of views, etc.) and/or be variable or dynamic (e.g., rendered based on a viewer position, rendered based on a number of viewers, etc.). When the set of views is variable, the set of views (e.g., the set of views sent to a viewer, the set of views sent to each viewer, etc.) can depend on: the viewers' position (e.g., distance from the display), the number of viewers, the mode of operation for the display, viewer movement, viewer preferences, the light field image, the number of views, and/or any suitable parameter(s). The set of views displayed to each viewer are preferably unique (e.g., each viewer perceives the scene represented by the views differently, each viewer perceives a different scene represented by different views, each viewer perceives a different channel, etc.), but can be overlapping and/or identical. The set of views can include any suitable number of views between 1 and 1000, such as 2, 3, 5, 10, 20, 45, 50, 75, 90, 100, 135, 150, 200, 250, and/or can include any suitable number of views. In an illustrative example, the system can display 2 views per viewer. In this example, each view can correspond to an eye of the viewer (e.g., one view transmitted to a viewer's left eye and one view transmitted to a viewer's right eye). The views of the set of views can be equally spaced or unequally spaced. Views can be referred to by an integer value (e.g., view 1, 2, 3, 5, 10, 20, N), by noninteger values (e.g., rational values, irrational values, etc. such as view 8.5, 9.7, 10.3, 11.04, etc.), and/or by any suitable values. The views can be referenced (e.g., numbered) to a viewer (e.g., a viewer position, a reference viewer, etc.), a camera position (e.g., a camera used to capture an image), a display configuration, a lightfield image, a location in space, and/or otherwise be referenced. For example, a first viewer can be associated (e.g., at a location associated with) with view 1, where a second viewer can be associated with view 8.5. However, the views can otherwise be referenced. However, the system can display any suitable number of views.

In some variants, the system (and/or method) can overdrive views, which functions to improve the smoothness of the perceived scene and/or reduces the perception of artifacts. Overdriving views can correspond to using more views than are necessary to display a scene. Overdriving views can decrease, increase, and/or not change a per-view resolution. In an illustrative example, overdriving views can correspond to using 120 views to generate a scene that can be represented in 45 views. In a specific example, overdriving views can reduce double image artifacts (e.g., the appearance of duplicate objects in the scene that are from the focal plane) by introducing additional views leading to the perception of blurring of the views.

In some variants, the system (and/or method) can refocus (e.g., dynamically refocus) the lightfield image, for example to change a portion of the lightfield image that is in focus (e.g., a focal plane of the lightfield image). The views can be post-processed (e.g., after the views are generated, change the focal plane of the views), generated (e.g., a plurality of sets of views can be generated with different focal planes, generating a new set of views at a different focal plane, etc.), and/or otherwise be processed to refocus the lightfield image. The lightfield image can be refocused to portions of the lightfield image selected manually (e.g., by a user, by a viewer, etc.), that are predetermined (e.g., according to a set refocusing path), based on the object(s) in the lightfield image, and/or otherwise selected focal planes.

Each view of the set of views can be indexed, named, tagged, associated with a source camera identifier (e.g., identifier for the camera sampling the respective view, identifier for the camera position that sampled the respective view, etc.), and/or otherwise uniquely identified (e.g. within the light field image, globally, etc.).

In specific examples, the set of views and/or light field image can have any suitable representation as disclosed in U.S. patent application Ser. No. 17/226,404, entitled "SYSTEM AND METHOD FOR GENERATING LIGHT FIELD IMAGES," filed on 09-Apr.-2021, incorporated in its entirety by this reference. However, the set of views can otherwise be represented.

The display(s) function to display a set of views 150 (e.g., associated with a light field image and/or light field video). The display can optionally enhance the perception of the views as having depth (e.g., enhance the perception of the views as being 3D), and/or display any suitable image. The display preferably has a refresh rate (e.g., a rate at which the display updates the displayed views) between about 1 ms and 1s. However, the display can have any suitable refresh rate. The display can include one or more: light sources 120 (e.g., pixelated light sources, continuous light sources, OLED, etc.), optical elements 140 (e.g., lenses; polarizers; waveplates; filters such as neutral density filters, color filters, etc.; beam steerers; liquid crystals; etc.), parallax generators 160, optical volumes 180, volumetric guides 185, and/or any suitable components. The display width can be any value between about 10 cm and 2500 cm. However, the display can have any suitable width. The display height can be any value between about 10 cm and about 1000 cm. However, the display can have any suitable height. In specific examples, the display can be any suitable display as disclosed in U.S. Pat. No. 10,191,295 entitled 'ADVANCED RETROREFLECTING AERIAL DISPLAYS', filed on 05-Jan.-2018 or U.S. Pat. No. 10,298,921 entitled 'SUPER-STEREOSCOPIC DISPLAY WITH ENHANCED OFF-ANGLE SEPARATION,' filed on 24-Jul.-2018, each of which is incorporated herein in its entirety by this reference. In some embodiments, a parallax generator (e.g., lenticular lens) can include a spatial light modulator (such as a layered liquid crystal array) which can function to enable dynamic configuration of the parallax generator. The spatial light modulator can be used as the entire parallax generator, in conjunction with a fixed parallax generator (e.g., refractive lens, refractive lenticular array, etc.), and/or can otherwise be used. However, any display can be used.

In an illustrative example, a display can include: a light source; a lenticular lens optically coupled to the first light source that, with the first light source, generates a light output having viewing angle dependency; and, optionally, a high-index optical volume optically coupled to the lenticular lens; wherein the optical volume has an index of refraction greater than one (e.g., such as a rectangular prism including a transparent polymer; index of refraction greater than 1.0, 1.01, 1.02, 1.03, 1.05, 1.1, 1.12, 1.14, 1.16, 1.18, 1.2, 1.23, 1.26, 1.27, 1.3, 1.35, 1.4, 1.45, 1.5, 1.7, 2.0, >2, values therebetween; etc.); wherein the first light source transmits the light output to the high-index optical volume, wherein the high-index optical volume transmits the light output to free-space. The lenticular lens can include a one-dimensional lenticular lens oriented at an angle of between zero and ninety degrees (e.g., 0°, 1°, 2°, 3°, 5°, 7°, 10°, 12°, 15°, 20°, 25°, 30°, 35°, 40°, 45°, 50°, 60°, 70°, 75°, 80°, 85°, 90°, values therebetween, etc.) relative to addressable columns of the light source, which can result in apportionment of resolution loss across both the addressable columns and addressable rows of the first light source. In a variation of the illustrative example, the optical volume can be defined by a frame of the display extending substantially perpendicular to the light source and/or otherwise be defined. The frame can include one or more reflective surfaces directed toward the optical volume. In this variation, the optical volume can, but does not need to, have a high index of refraction (for example, the optical volume can include and/or be air). However, any suitable display can be used.

Figure 3:
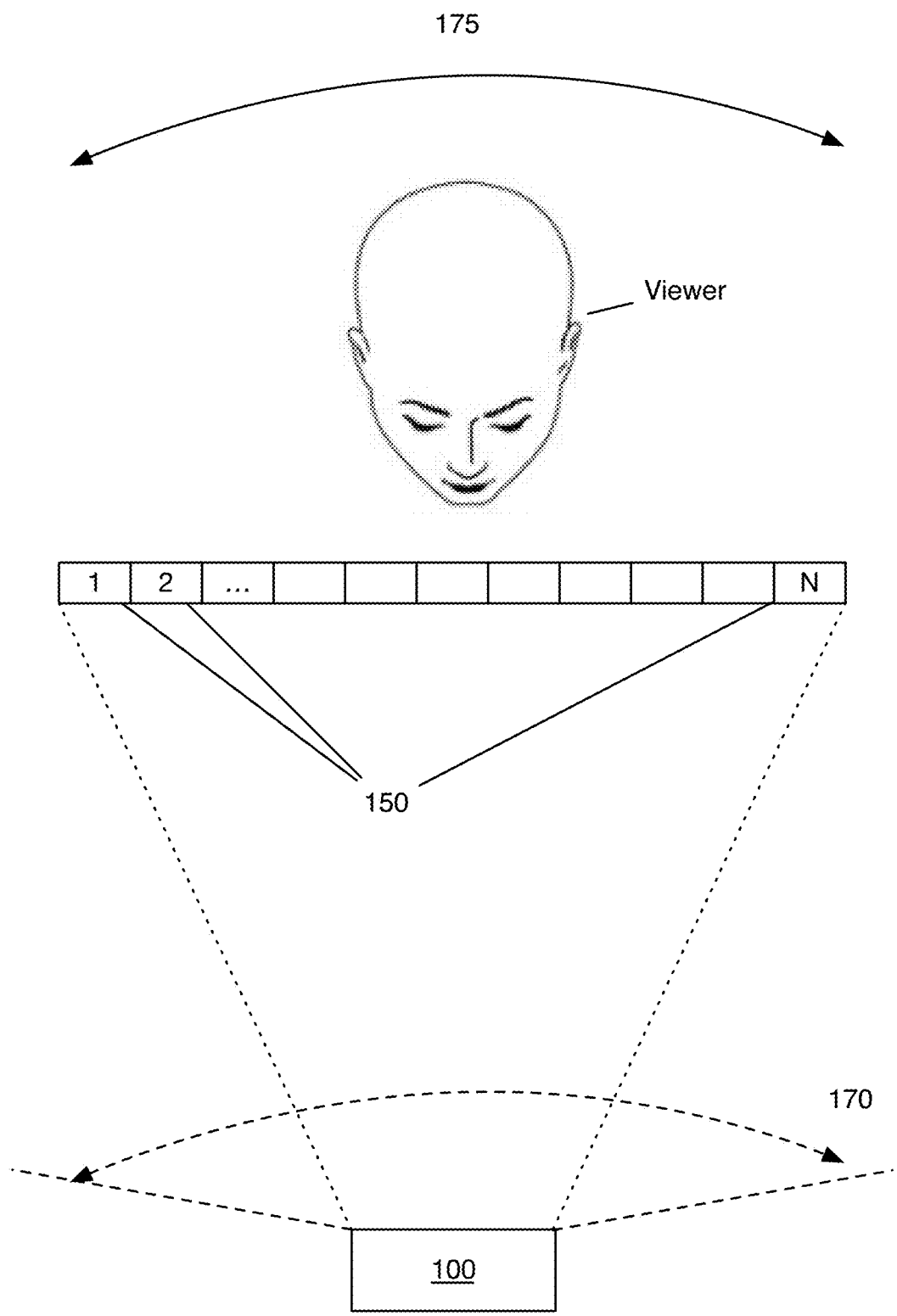
FIG. 3 is a schematic representation of an example of a viewcone for a display.

As shown in FIG. 3, the display can define a view arc 170, which can specify the area adjacent the display from which a viewer can see a view projected by the display. The display can additionally define one or more viewcones 175 within the view arc, wherein the display projects one or more views into a viewcone. The viewcone can be set based on the optical elements, the optical volume, the parallax generator, and/or any suitable component. The view arc (e.g., opposing the light source across the optical volume) can be between approximately 1° to 160° (e.g., from a display normal vector), or have another extent. The viewcone can be any suitable fraction of the arc that the views can be projected into (e.g., 10%, 20%, 33%, 50%, 75%, 100%, etc.). However, the viewcone can be a fixed angular spread (e.g., 10°, 20°, 30°, 50°, 75°, 90°, 100°, 120°, 135°, 150°, etc.) and/or any suitable arc angle. When the viewcone does not span the full view arc, the viewcone can be directed in any suitable direction within the view arc. The viewcone is preferably contiguous, but can be noncontiguous. Usually, only viewers within the viewcone can perceive views. However, in some variants, viewers outside the viewcone may perceive views (e.g., ghost views, secondary views, etc.); such as views that can result from views passing through non-preferential and/or non-primary paths of the parallax generator and/or the optics of the display.

The display can optionally include a beam steering mechanism, which functions to direct light rays and/or views to a specific direction in space (e.g., by changing a focal length of optics within the display). In specific examples, the beam steering mechanism can include mirrors (e.g., mechanically moveable mirrors), liquid crystal modulators, acousto-optic modulators, phase modulators, polarization modulators and/or polarization optics, mechanical gimbals, galvanometers (e.g., that rotate mirrors), risley prisms, phase based optics, and/or any suitable beam steering mechanism. However, beam steering can be performed by a computing system (e.g., by modifying the alignment between one or more views and the parallax generator) and/or be performed by any component.

Figure 4:
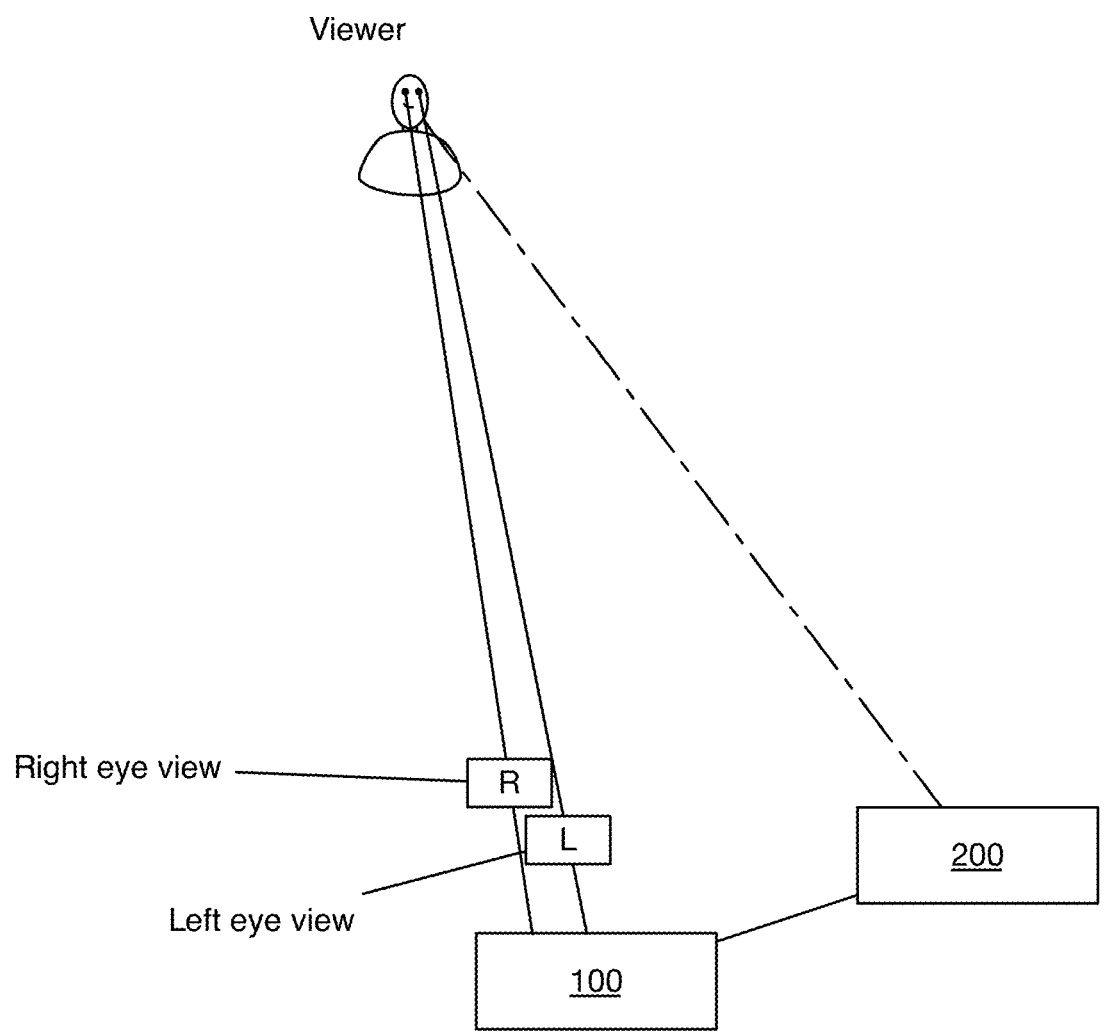
FIG. 4 is a schematic representation of an example of displaying a view to a user's right and left eye based on a gaze tracker.
Figure 5:
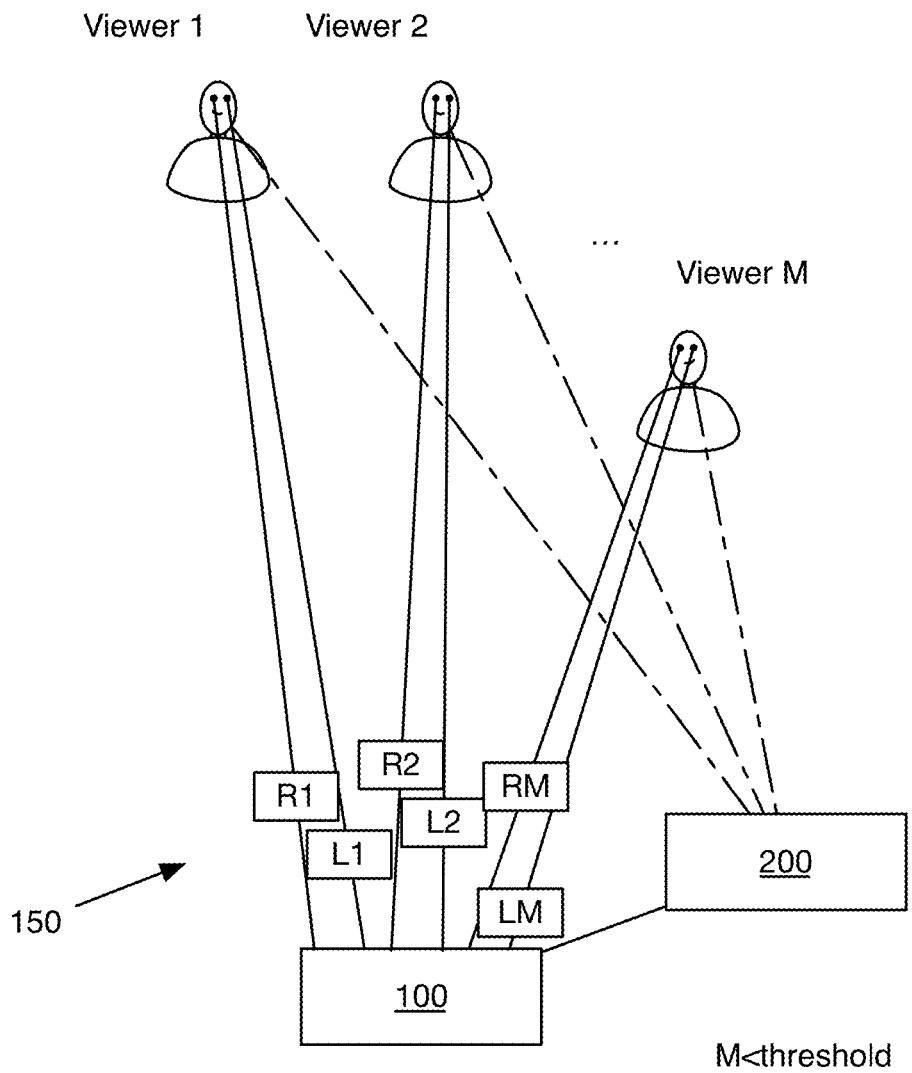
FIG. 5 is a schematic representation of an example of operating a display in a bounded user display mode.
Figure 6:
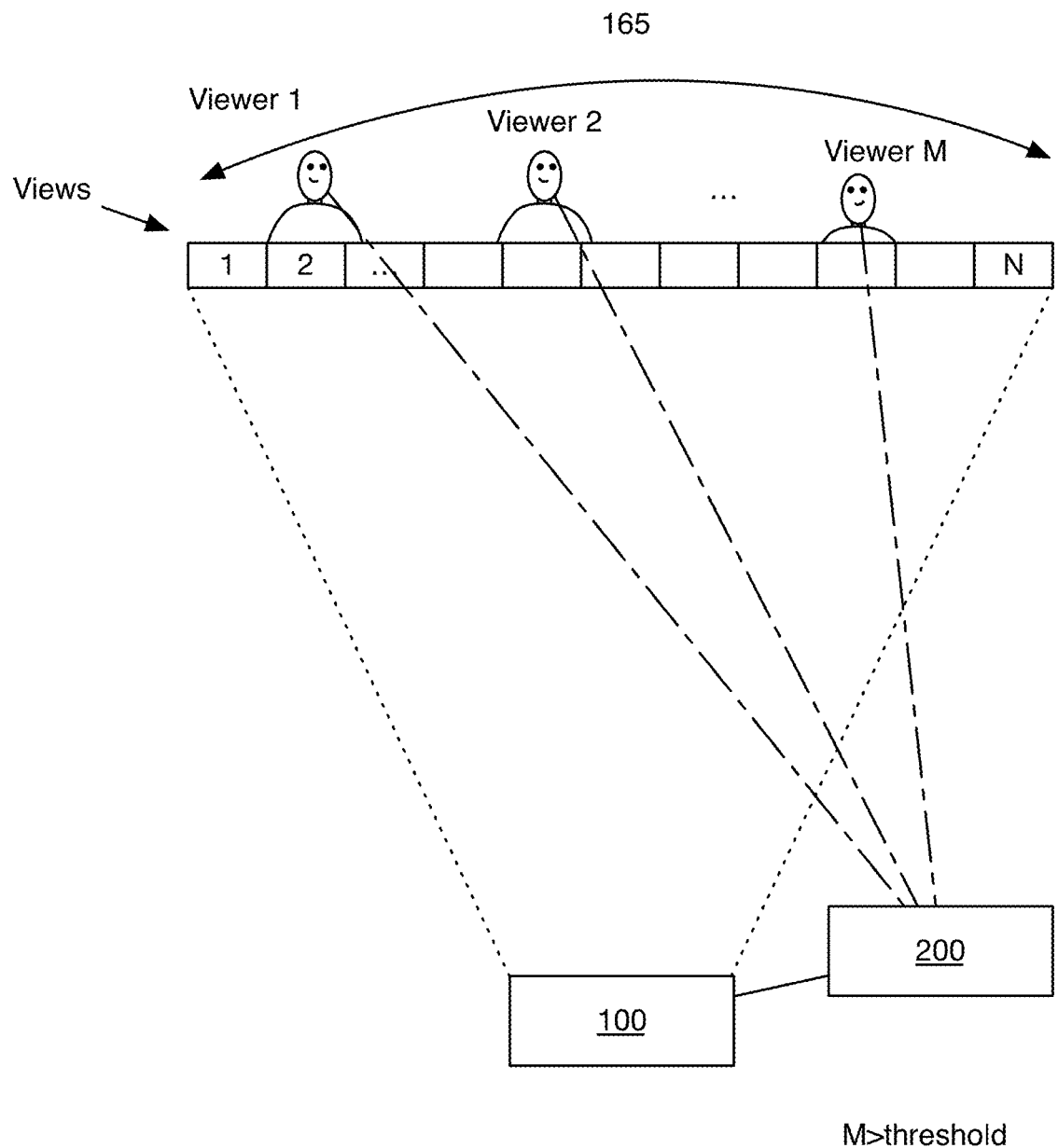
FIG. 6 is a schematic representation of an example of operating a display in an unbounded user mode.
Figure 15:
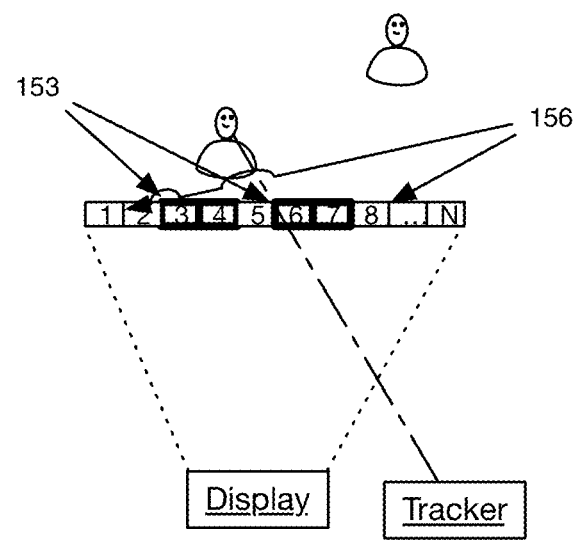
FIG. 15 is a schematic representation of an example of a display operating in a tracked mode and untracked mode simultaneously.

The display is preferably operable in a plurality of modes. However, the display can be operable in a single mode and/or any suitable manner. The display can be operable in a plurality of modes simultaneously and/or can only operate in a single mode (e.g., at a time). In an illustrative example of operating in two or more modes simultaneously (example as shown in FIG. 15), a first subset of views 153 can be presented in a manner consistent with a first mode and a second subset of views 156 (e.g., the remaining views) can be presented using the display in a manner consistent with the second mode. The first and second subset of views preferably do not include common or shared views, but can, in some embodiments, share one or more views. However, the display can otherwise be operable in a plurality of modes. Examples of modes the display can operate in include: tracked mode (e.g., bounded mode, focus mode, as shown for example in FIGS. 4 and 5, etc.), untracked mode (e.g., unbounded mode, as shown for example in FIG. 6, etc.), a pseudo-tracked mode (e.g., indicative of a viewer entering tracking mode, when one viewer is tracked and another is entering tracking to ensure that views not associated with the first viewer are not blanked, etc.), a transition mode, an interactive mode, an informational display mode (e.g., a 2D display mode), and/or any suitable modes.

The modes can be determined (e.g., selected, switched between, etc.) based on a number of viewers, an ability for a sensor or computing system to lock in on tracking viewer(s), viewer pose, viewer distance from the display, a number of displayed views, viewer preference(s) or selection(s), a holographic image displayed using the display, a display type, and/or based on any suitable criterion. In a first example, the display can operate in a first mode when at most a threshold number of viewers are present and/or tracked and the display can operate in a second mode when more than the threshold number of viewers are present. The threshold number can be any number between about 1 and N/2 (such as 1, 2, 3, 4, 5, 6, 7, 8, 9, 10, 20, etc. viewers) a number of viewers that depends on a viewcone, a number of viewers that depends on the view arc, a number of viewers that depends on the number of views, depend on the viewer positions (e.g., distance from the display, distance between viewers, angular spread relative to the display, relative to a transition region, etc.), vertical parallax (e.g., differences in heights between viewers), viewer movement (e.g., detected movement, anticipated movement, velocity, acceleration, etc.), and/or any suitable number of viewers. The size of a transition region (e.g., distance from a display, distance between viewers, etc.) can be constant and/or vary. For example, the size of the transition region can depend on a time since the display transitioned between modes, depend on the number of viewers, depend on the tracking sensor (e.g., latency, speed, accuracy, etc.), a distance between the viewer(so and the display, and/or any suitable properties. The transition region can be the same or different from the display and/or tracking regions. The transition region can be centered on the display, on a viewer (e.g., a viewer in tracked mode, a viewer whose position is locked, a first viewer, a viewer with a predetermined orientation of the display, etc.), on a predetermined point relative to the display and/or a viewer, on the tracking sensor, and/or otherwise be centered. However, the transition region can otherwise be located. In variants, a plurality of transition regions can be used (for example to facilitate transition damping, to enable transitions in response to different conditions, etc.). In a second illustrative example, when no viewers are tracked (e.g., a viewer pose such as head pose or eye pose are not determined), the display can operate in an untracked mode; when one or more viewers are tracked, the display can operate in a tracked mode. However, the display can operate in any suitable modes.

In the tracked mode, one or more views of the set of views are preferably processed (e.g., as described in S400 or otherwise processed) based on the viewer pose (e.g., as determined using a sensor). For example, one view can be processed (and/or displayed) when a viewer is greater than a threshold distance from the display (e.g., 30 cm, 50 cm, 100 cm, 200 cm, 500 cm, 10 m, 20 m, 50 m, values therebetween, >50 m) and/or when the display is used in an informational display mode (e.g., at the same time as a tracked mode, in an untracked mode, as a stand-alone mode, etc.). The tracked mode can have the benefit of providing a higher resolution (e.g., perceived or actual resolution such as greater depth perception, more pixels displaying a given view, less blurriness, less crosstalk, etc.) holographic image.

In the untracked mode, the set of views (e.g., the set of views to be presented in the untracked mode) are preferably presented without processing (e.g., without processing beyond rendering and aligning the views to the display). However, the views can be processed or modified in the untracked mode. The untracked mode can have the benefits of requiring less power to operate, accommodating more viewers, and/or can provide any suitable benefits.

The display preferably smoothly transitions between the modes (e.g., transitions between the modes such that a viewer does not notice that the display has transitioned between modes). However, the transition between modes can be abrupt, unexpected, noticeable, and/or otherwise not be smooth.

In some variants, a smooth transition is enabled by having a region where viewers are tracked (e.g., where tracking lock is established, where viewers begin to be tracked, etc.) that is larger than the region where the display presents views to the viewers based on the viewer pose. These variants can function to ensure that a viewer pose is determined facilitating view processing based on the viewer pose. In related variants, a plurality of regions can be present where, as the viewer approaches the display, the views are progressively transitioned from being processed according to a first mode to being processed according to the second mode. However, the transition can occur without specific regions where the transition occurs, the tracking region can be equal to or smaller than the displayed region (e.g., wherein the display processed the views according to a viewer pose estimate outside of the tracking region), and/or the smooth transition can otherwise be enabled.

Figure 14:
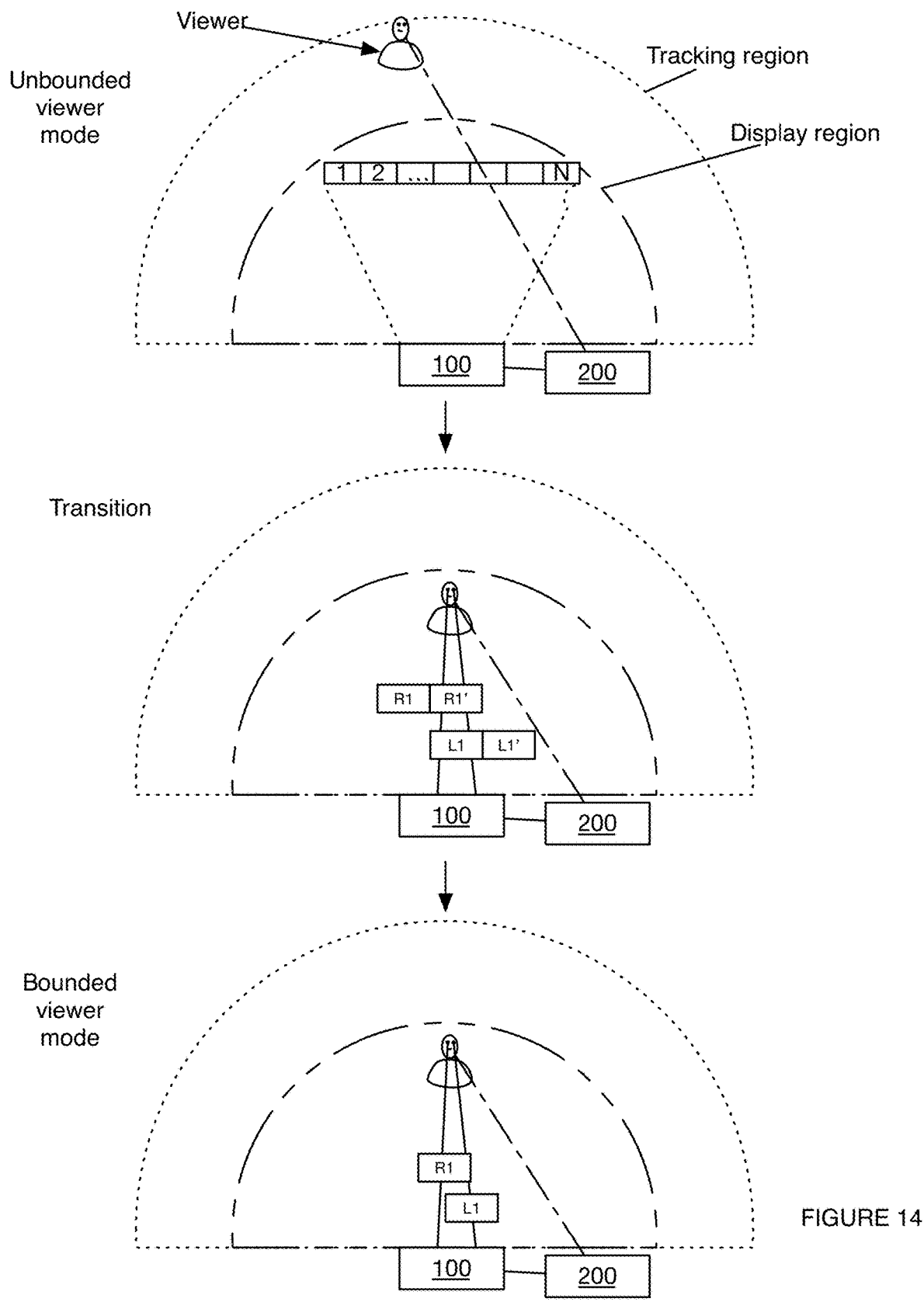
FIG. 14 is a schematic representation of an example of transitioning a display from an untracked mode to a tracked mode.

In an illustrative example of a smooth transition, as shown for example in FIG. 14, as a viewer approaches the display, the viewer pose can be determined (e.g., tracked). In this example, as the viewer approaches the display, a first subset of views can be processed and displayed to the viewer. After the transition is complete, a final subset of views can be processed and displayed to the viewer. Typically, when transitioning from an untracked to a tracked mode as in this example, the final subset of views will have fewer views than the first subset of views. However, the final subset of views can have an equal or greater number of views than the first subset of views.

Figure 19:
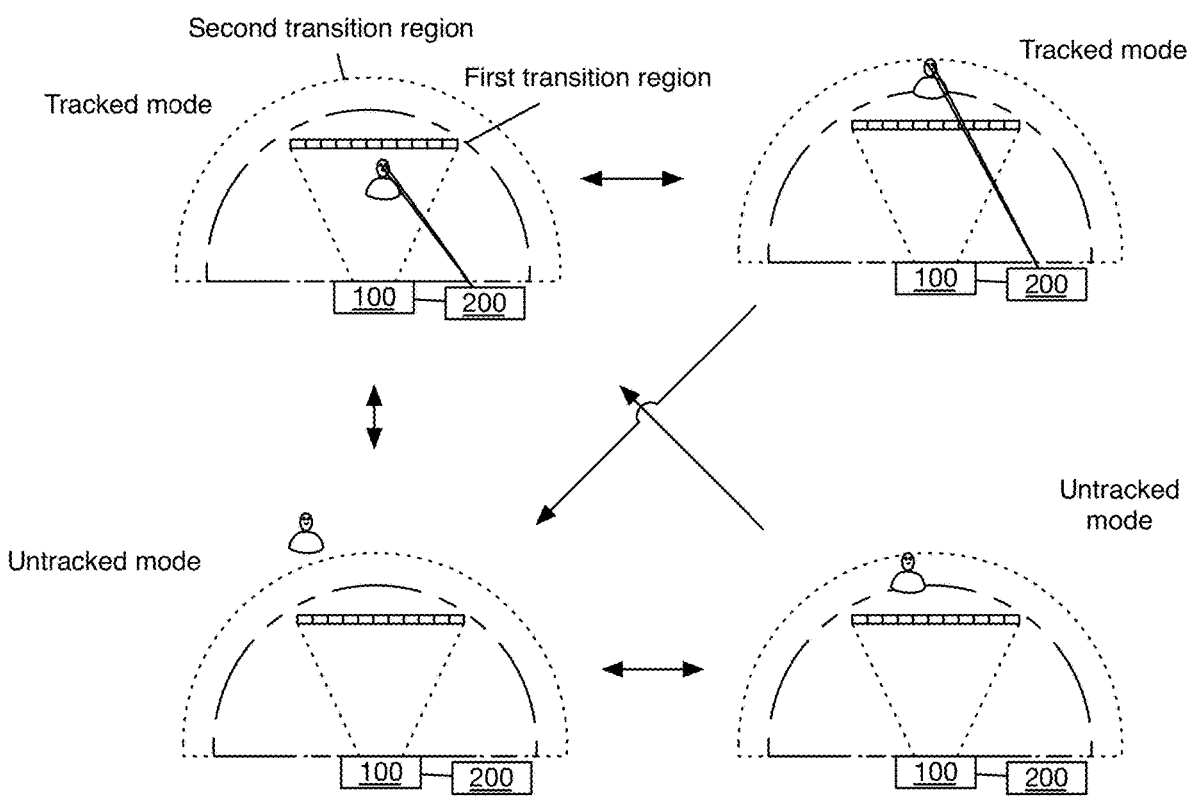
FIG. 19 is a schematic representation of an example of a plurality of transition regions and the display operation mode for different viewer positions relative to the transition regions.

The display preferably dampens transitions between the modes, which can function to decrease a frequency of transitioning between modes. The transition dampening can be facilitated, for example, by using a dampening region. The damping region can be particularly, but not solely, beneficial when a transition is triggered by a distance criterion (e.g., distance between viewers, distance between a viewer and the display, an orientation of the viewer and the display, etc.). Typically, the damping region is larger than the transition region so that when the display transitions from a first mode to a second mode, a viewer does not experience the display flipping between the modes (e.g., because the viewer is standing at or near the threshold between regions). However, the damping region can be the same size as or smaller than the transition region. In an illustrative example, when a display transitions to an unbounded viewer mode when a distance between two viewers is at most a threshold distance, the display can transition back to the bounded viewer mode when the distance is at least a second threshold distance. However, the display can otherwise transition between modes. In a second illustrative example as shown for example in FIG. 19, when a viewer is within a first predetermined distance (such as 0.9 m) of the display, the display can operate in a tracked mode and when the viewer is greater than a second predetermined distance of the display (e.g., a distance larger than the first predetermined distance such as 1.1 m) the display can operate in an untracked mode. In the second illustrative example, when a viewer is located between the first and second predetermined distance, the display can operate in the last mode the viewer was in, the last mode the display operated in, based on the last threshold distance that the viewer crossed, and/or in any suitable mode.

However, additionally or alternatively, the dampening of transitions can be enabled by a threshold transition time (e.g., a threshold amount of time that elapses between transitions such as <0.01 s, 0.01 s, 0.02 s, 0.05 s, 0.1 s, 0.2 s, 0.5 s, 1 s, 2 s, 5 s, 10 s, 20 s, 30 s, 60 s, values therebetween, >60 s), a threshold viewer change (e.g., a threshold change in orientation or position of the viewer such as a change of <0.01°, 0.01°, 0.02°, 0.05°, 0.1°, 0.2°, 0.5°, 1°, 2°, 5°, 10°, 20°, 30°, values therebetween, >30°; <1 mm, 1 mm, 2 mm, 5 mm, 1 cm, 2 cm, 5 cm, 10 cm, 20 cm, 50 cm, 100 cm, values therebetween, >100 cm; etc.), and/or any suitable transition criteria.

The display preferably transitions between the unbounded user and the bounded user modes during operation of the display. However, the display can instantaneously (e.g., during a single refresh) change modes, be fixed in a mode (e.g., at start-up, after manufacture, etc.), and/or the modes can be switched between in any manner. The transition is preferably smooth (e.g., a gradual change), but can be jerky. A smooth transition can function to prevent user(s) from experiencing motion-sickness, confusing perspective changes, and/or any adverse effects from rapid changes in perspective and/or changes in view. The transition can take place over a transition time window. The transition time window can depend on the number of users (e.g., initial number of users, current number of users, anticipated number of users, etc.), user preference, user sensitivity, user setting, display refresh rate, tracking latency, tracking refresh rate, and/or any suitable parameter. The transition time window can have a duration between about 0.01-60 s and/or have any suitable duration of time. In some variants, one (or more) transition frames (e.g., a generic lightfield image associated with a transition, a transitional light field image based on the display light field image, etc.) can be presented when the display changes between a tracked and an untracked mode, which can function to abruptly (e.g., within a single frame) transition the display mode. In an illustrative example, a transition frame can be a lightfield image that includes a monochromatic view (such as white, blue, red, green, or other color view) in a position to be presented or displayed to a viewer. The transition frame can be presented for a transition time (such as a value or range of time between about 0.01 s and 5 s) and/or for any suitable amount of time. However, the transition frame(s) can include interrupting stimuli, distracting stimuli, and/or any suitable stimuli or image(s).

The transition preferably occurs in response to a transition condition. The transition condition can include: a user input, sensor data, a position of one or more user (e.g., a user distance greater than a threshold distance from the display, separation distance between users greater than a threshold distance, etc.), a change in position of one or more users (e.g., a user motion greater than a threshold user motion), a number of users (e.g., a number of users greater than or equal to a threshold number of users, a number of users less than or equal to a threshold number of users, etc.), a change in the number of users, an amount of available processing power, a data bandwidth, a lightfield image (e.g., image content, selected image, etc.), a lightfield video, and/or any transition condition. The transition can occur automatically (e.g., within a threshold time of the threshold condition detection), semi-automatically (e.g., responsive to a prompt for user input, wherein the prompt can be generated in response to a threshold condition detection), manually, and/or with any timing.

Figure 8:
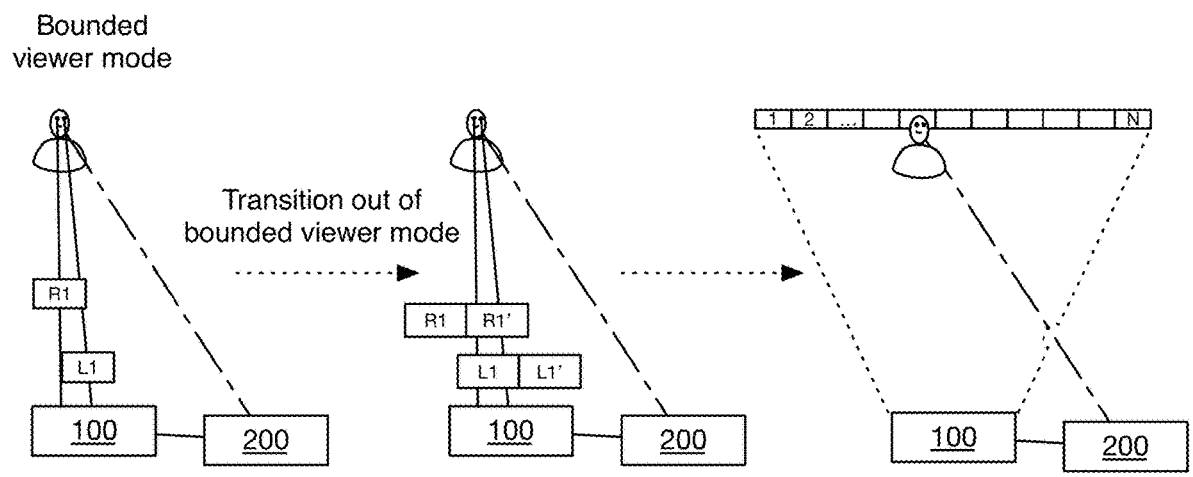
FIG. 8 is a schematic representation of an example of a smooth transition from a bounded operation mode to an unbounded operation mode.
Figure 9A:
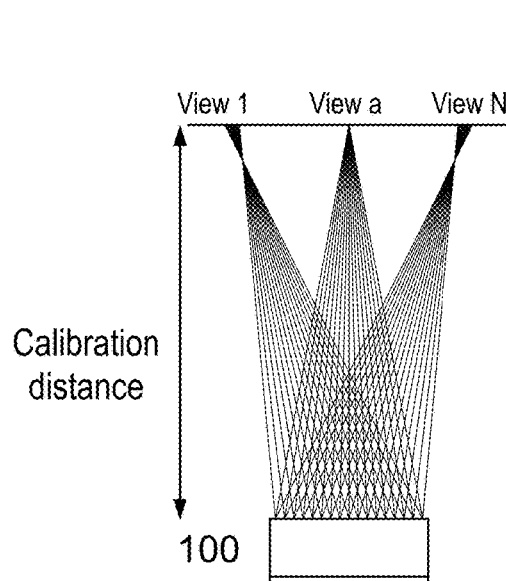
FIGS. 9A and 9B are schematic representations of examples of a convergent calibration at two calibration distances.
Figure 9B:
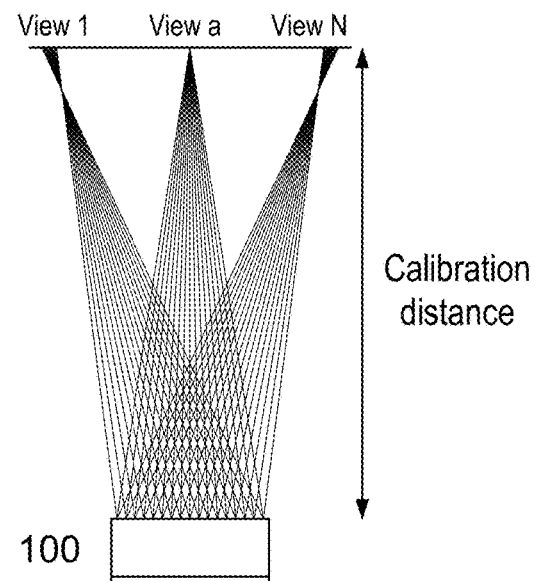
Figure 10A:
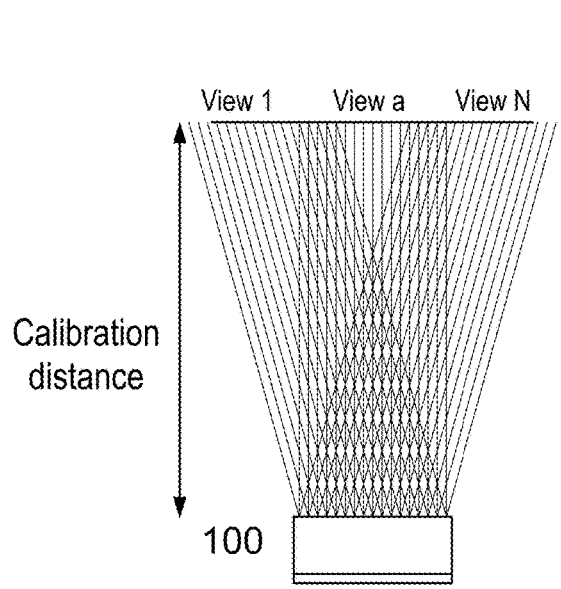
FIGS. 10A and 10B are schematic representations of examples of an orthographic calibration at two calibration distances.
Figure 10B:
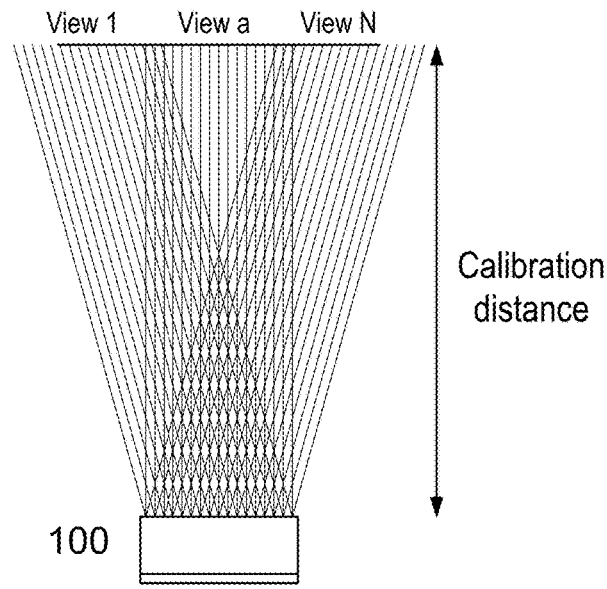

In a specific example of transitioning from a bounded mode to an unbounded mode, as shown in FIG. 8, the display can increase the number of views being displayed. For instance, the number of displayed views can increase every time the display refreshes, until all views are displayed. In a second specific example, such as when the views are displayed in a ray format, transitioning from a bounded mode to an unbounded mode can include interpolating and/or smoothing additional views (e.g., each time the display refreshes) until the display is displaying all views. However, the transition can be performed in any suitable manner.

The computing system functions to process and/or generate views, determine viewer positions, and/or control the camera, sensor(s), and/or display. The computing system can be local (e.g., to a display, to a sensor, etc.), remote (e.g., cloud computing, server, network, etc.), and/or distributed (e.g., between a local and a remote computing system). The computing system can be in communication with the display, the sensor(s), the user interface, and/or with any suitable components. The computing system can include a calibration module, a storage module, a tracking module, a view module, a communication module, and/or any suitable modules.

The sensor(s) function to track the position and orientation (e.g., relative to the display) of one or more viewers. The sensor is preferably coupled to the display (e.g., in front of the optical volume, to a base of the display, etc.). However, the sensor(s) can be in communication with the display, in communication with the computing system, and/or in communication with any suitable component. The sensor preferably does not have any significant latency (e.g., latency is approximately 0 ms, where the latency can refer to an amount of time between the sensor measurement and the current value of the parameter measured by the sensor). However, the sensor can have a latency less than about 1 s, and/or any suitable latency. The sensor is preferably markerless (e.g., works without a viewer wearing or using a marker), but can require a marker (e.g., glasses, a headset, a target, etc.). In specific examples, the sensor can include: optical sensors (e.g., depth cameras, stereo cameras, interferometry, cameras, etc.), inertial tracking, acoustic tracking (e.g., using ultrasonic emitters, microphones, etc.), magnetic tracking, wireless tracking (e.g., using a set of anchors), eye and/or gaze trackers (e.g., eye-attached tracker, optical gaze tracking, electrical potential gaze tracking, etc.), and/or any suitable sensor(s).

In a specific example, a sensor can include an optical sensor (e.g., camera). The optical sensor can be a stereo camera (e.g., a pair of cameras), a monocular camera, a depth camera, and/or any suitable number or types of cameras. The optical sensor preferably includes a processor, where the processor is configured to identify (using artificial intelligence for example) a viewer head and/or eyes. The processor preferably identifies the viewers' head and/or eyes in real time (e.g., for each image acquired by the optical sensor, at a rate greater than or equal to an image acquisition rate of the optical sensor, etc.), but can identify the viewers' head and/or eyes delayed or offline. In a first specific example, a viewer feature can be detected using a machine learning algorithm (e.g., a trained neural network configured to identify the feature). The machine learning algorithm can be: an object detector, a segmentation algorithm, an instance-based segmentation algorithm, and/or other algorithm. In a second specific example, a viewer feature can be determined based on reflections from the feature (e.g., corneal reflections can be used to detect or identify an eye of the viewer). However, a viewer feature can otherwise be determined. A transformation (e.g., relationship) between the sensor and the display (e.g., a center of the display) is preferably known, where the transformation can be used to determine the viewer pose (e.g., the position and/or orientation of the viewers head or eyes). However, the transformation can be unknown (e.g., inferred or calculated during sensor operation).

In some embodiments, the sensor can be calibrated, which can facilitate or improve the determination of the relative position and/or orientation of the viewer(s) and/or other target to the display. However the sensor can be uncalibrated, not require calibration, and/or have any suitable calibration.

However, any suitable sensor can be used.

The optional user interface functions to allow a user to interact with the display and/or the displayed views. The user interface can be integrated into the display, coupled to the display, under the display, under the viewer(s) (e.g., a mat), arranged under an environment adjacent to the display (e.g., an environment in which part or all of the scene can be perceived in), in communication with the display, and/or be otherwise arranged. In variants, the user interface can be the same as (e.g., when the sensor is used to track a user gesture) and/or different from the sensor. In specific examples, the user interface can include: a touch interface (e.g., on surface of the optical volume, separate from display, etc.), a wand, an optical sensor (e.g., depth camera, stereo camera, monocular camera, interferometric, etc.), a magnetic sensor, an inertial sensor, a pointing device (e.g., a computer mouse), voice commands, a facial expression tracking mechanism, an eye tracking mechanism, and/or any suitable device and/or mechanism.

4. Method

The method can include determining a viewer position S200, processing views S400, and displaying views S500. The method can optionally include calibrating a display S100, determining display settings S300, and/or any suitable steps. The method functions to track the positions of one or more viewers and transmit a set of views (e.g., to the viewers). The method can be performed once or multiple times. The method and/or steps of the method can be performed iteratively. The iterations can occur at a rate based on: a sensor latency, a display refresh rate, a number of viewers, a viewer preference, a viewer setting, the set of views, and/or based on any parameter(s). In a specific example, steps S200-S500 can be performed iteratively (e.g., for each frame of a holographic video). In this specific example, as viewers and/or viewers' positions change, new display settings can be determined, the views can be processed in response to the viewers and/or viewers' positions, and the processed views can be displayed. However, any suitable steps of the method can be performed iteratively. The method is preferably performed with a system as disclosed above, but can additionally or alternatively be performed with any other suitable system.

Calibrating the display S100 functions to determine calibration parameters for the display operation. The calibration parameters can include: alignment between a pixel grid and a lenticular array, slope, center, pitch, serial number, model number, change in slope, change in center, change in pitch, viewcone inversion, a view alignment relative to a lenticular array (e.g., of the parallax generator), and/or any suitable parameter. The calibration parameters can be used to generate the views (e.g., used in S400 such as to determine a correspondence between pixels and views or 'lenticularlize' the views), to determine a view resolution, to determine a viewcone location, to display the views (e.g., used in S500), and/or be otherwise used. S100 can be performed manually (e.g., by a user modifying the calibration parameters while observing a calibration image on the display) and/or automatically (e.g., by using a calibration camera and computer vision, automated intelligence, etc.). S100 is preferably performed by a calibration module of a computing system cooperatively with a calibration camera. Additionally or alternatively, the calibration parameters can be determined via modeling (e.g., using a computing system) and/or using any suitable component. S100 is preferably performed once (e.g., when the display is manufactured, when the display is set-up, when the display is powered on, etc.), but can be performed more than once (e.g., for each set of viewers; based on a change in viewers such as number of viewers, position of viewers, etc.; etc.).

Calibrating the display can include displaying a calibration image using the display and modifying the calibration parameters until the calibration image achieves a target specification. The calibration image can include a calibration pattern. The calibration pattern can include a bullseye, a set of parallel lines, a set of perpendicular lines, a set of intersecting lines (e.g., with known intersection angle(s)), tiling of a shape, a checkerboard pattern, a charuco pattern, and/or any suitable pattern. However, any suitable calibration image can be used.

The target specification can include parallelism (e.g., of two or more lines that are supposed to be parallel within the calibration image), shift (e.g., how far is a reference such as a reference point, reference line, reference shape, reference surface, etc. of the calibration image shifted from a reference of the display such as the center of the display, an edge of the display, a corner of the display, etc.), sharpness (e.g., minimize edge thickness for features), blur, image continuity (e.g., threshold number of adjacent pixels in the image are adjacent in the displayed image), overlap (e.g., between the calibration image projected from one side of the display and the same calibration image displayed from the opposing side of the display, between views corresponding to a calibration image, between views corresponding to a light field image, etc.), and/or any suitable specifications. However, any suitable target specification (e.g., based on the calibration image, subjective quality, objective quality, etc.) can be used.

The calibration parameters can be modified automatically or manually. The calibration parameters can be modified continuously and/or in discrete steps.

Calibrating the display can include mounting a calibration camera at a calibration location opposing the display (e.g., across the optical volume). The calibration camera can be located a calibration distance away from the display. The calibration distance can based on the camera focal length (e.g., calibration camera focal length), the optical properties of the display (e.g., focal length of a lenticule of the parallax generator, optical volume index of refraction, etc.), a viewer distance (e.g., a normal viewer distance, a preferred viewer distance, average viewer distance, viewer distance for each viewer, etc.), average number of viewers, view crosstalk (e.g., spread of views, overlap of views, etc.), a calibration mode, and/or any suitable parameters. The calibration distance can be any distance between about 5 cm and 1000 cm such as 60 cm; however, the calibration distance can be less than 5 cm, greater than 1000 cm, or suitable distance. The calibration distance can be fixed or variable.

The calibration camera is preferably mounted along a central axis of the display (e.g., an axis that extends normal to a broad face of the display, an axis that intersects the centroid of the display, an axis that intersects the centroid of the optical volume, etc.). However, additionally or alternatively, the calibration camera can be mounted opposing (e.g., at the calibration distance) an edge of the display and/or opposing any suitable portion(s) of the display. Additionally or alternatively, the calibration camera can be positioned off-axis to the display and/or have any suitable orientation relative to the display.

The optical sensor of the calibration sensor is preferably arranged substantially parallel to a broad face of the display. However, the optical sensor can be arranged at any suitable angle relative to the broad face of the display.

In a first variant, the calibration parameters can be determined using a camera at a fixed calibration distance. These calibration parameters can be used as static calibration parameters.

In a second variant, the calibration parameters can be determined using a camera that is arranged at a plurality of calibration distances. In this variant, the calibration parameters for any distance from the display can be determined by interpolating between and/or extrapolating from the measured calibration parameters. In a specific example, as shown in FIGS. 9A, 9B, 10A, and 10B, a first calibration parameter can be measured with the camera at a first calibration distance (such as 60 cm) and a second calibration parameter can be measured with the calibration camera at a second calibration distance (such as 500 cm). The first calibration parameter can be a 'convergent' calibration parameter, such that a plurality of views projected from the display converge (e.g., are focused or nearly focused) at the distance (e.g., the calibration distance) from the display. The second calibration parameter can be an 'orthographic' calibration parameter, such that a plurality of views projected from the display converge at infinity (and/or at a distance significantly larger than the size of the display such as 10×, 20×, 50×, 100×, etc. a dimension such as length, width, diagonal length, etc. of the display). However, the "convergent" calibration parameter can correspond to a view arrangement (e.g., alignment of pixels associated with the view) relative to the parallax generator (e.g., lenticular array of the parallax generator) such that the view converges at the calibration camera and/or be otherwise defined. The "orthographic" calibration parameter can additionally or alternatively refer to a calibration such that the view arrangement relative to the parallax generator corresponds to a view displayed from one edge of the display converging on a view from the opposing edge of the display at infinity (and/or at any large distance) and/or be otherwise defined. However, the calibration parameters can be measured at any calibration distances.

However, the calibration parameters can be determined in any suitable manner.

S100 can include calibrating the sensor (e.g., calibrating the tracking sensor), which can function to determine (and/or correct for) errors in the sensor's measurements (e.g., to improve an accuracy or precision of the determined viewer position and/or orientation). In a specific example, calibrating the sensor can include: measuring an object's position at a plurality of known positions and orientations, fitting the tracked object's positions, and comparing the measured object positions to the known object positions to determine a set of sensor calibration parameters (e.g., that can be applied in real- or near-real time to update the viewer or tracked objects position). However, calibrating the sensor can otherwise be performed.

Determining user position S200 functions to determine how many viewers are observing the display and/or the pose of the viewers or a feature of the viewers (e.g., relative to the display). S200 is preferably performed by the sensors, but can be performed by a computing system and/or any suitable component. S200 is preferably performed after S100, but can be performed before S100 and/or at the same time as S100. S200 can include determining the distance between the display and each viewer (e.g., separation distance such as the linear distance between a centroid, edge, vertex, etc. of the display and the viewer's eyes, head, centroid, face, glabella, nose, hairline, etc.; vertical distance such as the distance from the centroid, edge, vertex, etc. of the display to the viewer's eyes, head, centroid, face, glabella, nose, hairline, etc.; depth such as the distance between a display plane, for example defined by a surface of the display, and a reference plane parallel to the display plane that intersects the viewer, distance between the surface of the display and the viewers' eyes, etc.; etc.), determining the distance (e.g., average distance, current distance, absolute distance, relative distance, etc.) between the display and the users, and/or determining any suitable distance. The distance is preferably determined with an accuracy of at least 1 cm (e.g., the viewer position is within 1 mm, 2 mm, 3 mm, 4 mm, 5 mm, 6 mm, 7 mm, 8 mm, 9 mm, 1 cm, etc. of the measured viewer position), but can be determined with a position accuracy greater than 1 cm (e.g., 2 cm, 5 cm, 10 cm, etc.). S200 is preferably performed at the same rate as the display refreshes (e.g., the rate new frames or holographic images are displayed by the display), but can be performed at a sensor latency, for a subset of display refreshes (e.g., every $2^{nd}$, $3^{rd}$, $5^{th}$, $10^{th}$, $20^{th}$, $50^{th}$, etc. refresh), multiple times per display refresh, and/or at any suitable rate.

S200 preferably includes determining the pose (e.g., position and/or orientation) of each viewers' eyes (relative to the display), but can determine the location of a viewer's head, nose, face, glabella, hairline, and/or the location of any suitable viewer feature. S200 can optionally track gaze or focus of a viewer. S200 can optionally track and/or estimate viewer movement (e.g., detected movement, anticipated movement, velocity, acceleration, etc.), for example by performing dead reckoning to estimate a future viewer position.

Figure 7A:
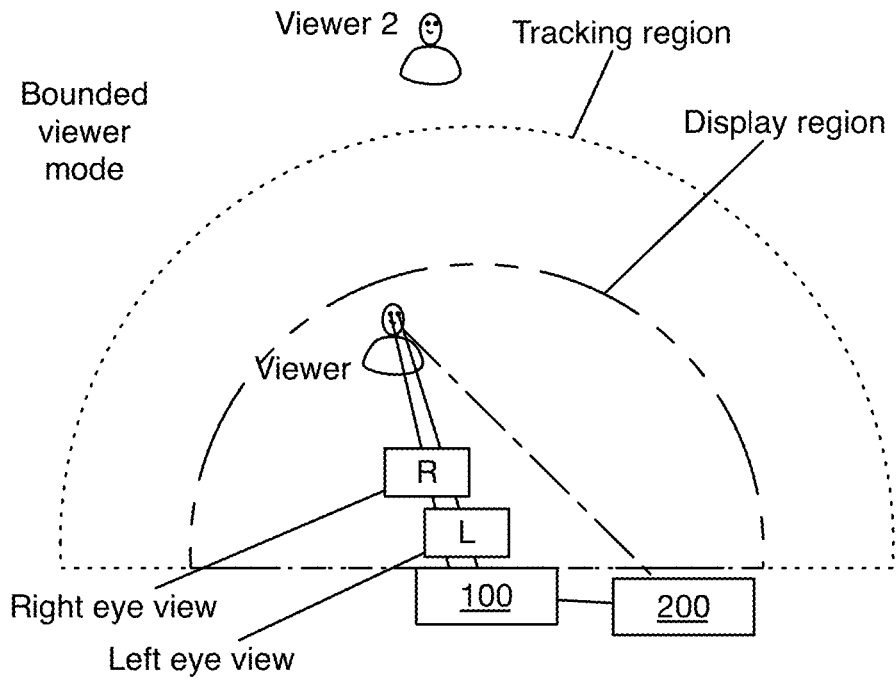
FIGS. 7A-7C are schematic representations of examples of operating transitioning a display from a bounded user mode to an unbounded user mode based on tracking new users.
Figure 7B:
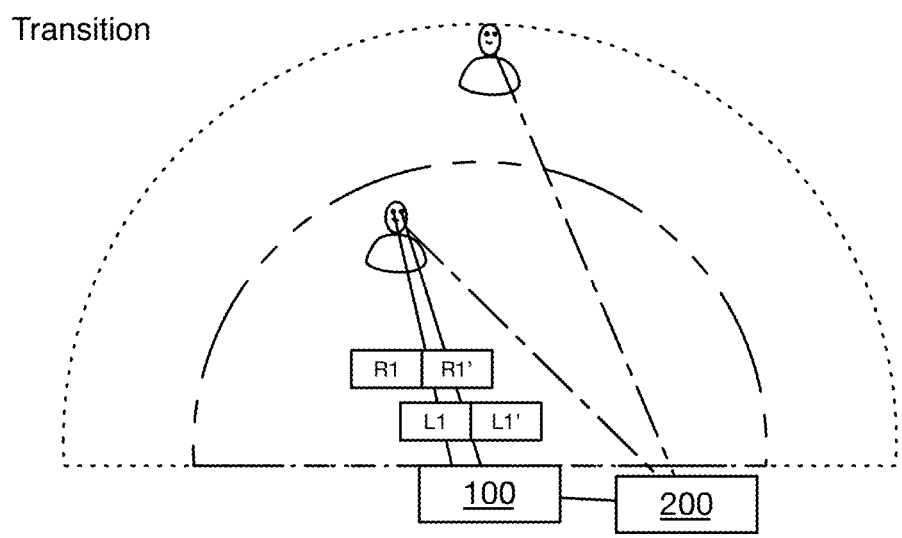
Figure 7C:
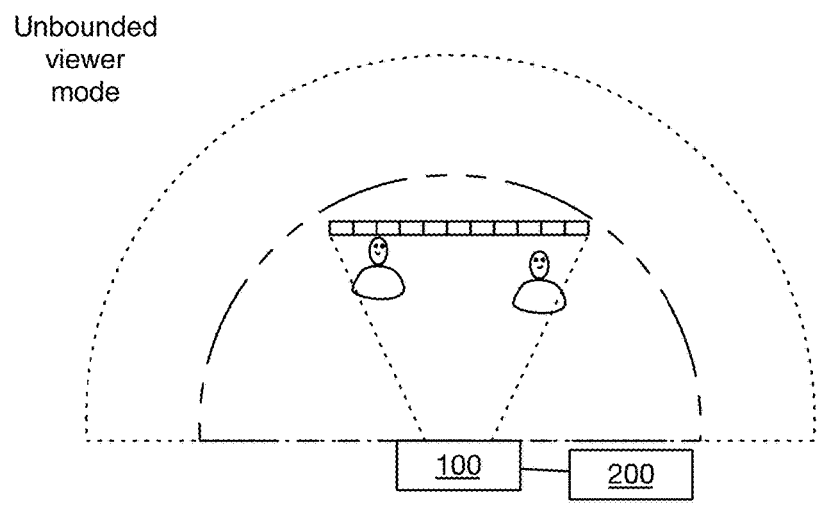

In variants, as shown in FIGS. 7A-7C, the viewers' positions can be determined and/or tracked over a larger region (e.g., a tracking region) than the display directly transmits views to the viewer (e.g., a display region). These variants can function to facilitate smooth transitions (e.g., by processing the views in a manner as described in S400 or otherwise processing or presenting the views) between modes such as between a bounded mode and an unbounded mode by providing information on transitions in the number and/or positions of viewers before the display presents views to the viewers. However, the tracking region can be smaller than the display region (e.g., when operating the display in a mode that includes tracking over a smaller spatial area) and/or the tracking region and display region can be the same size.

Figure 16:
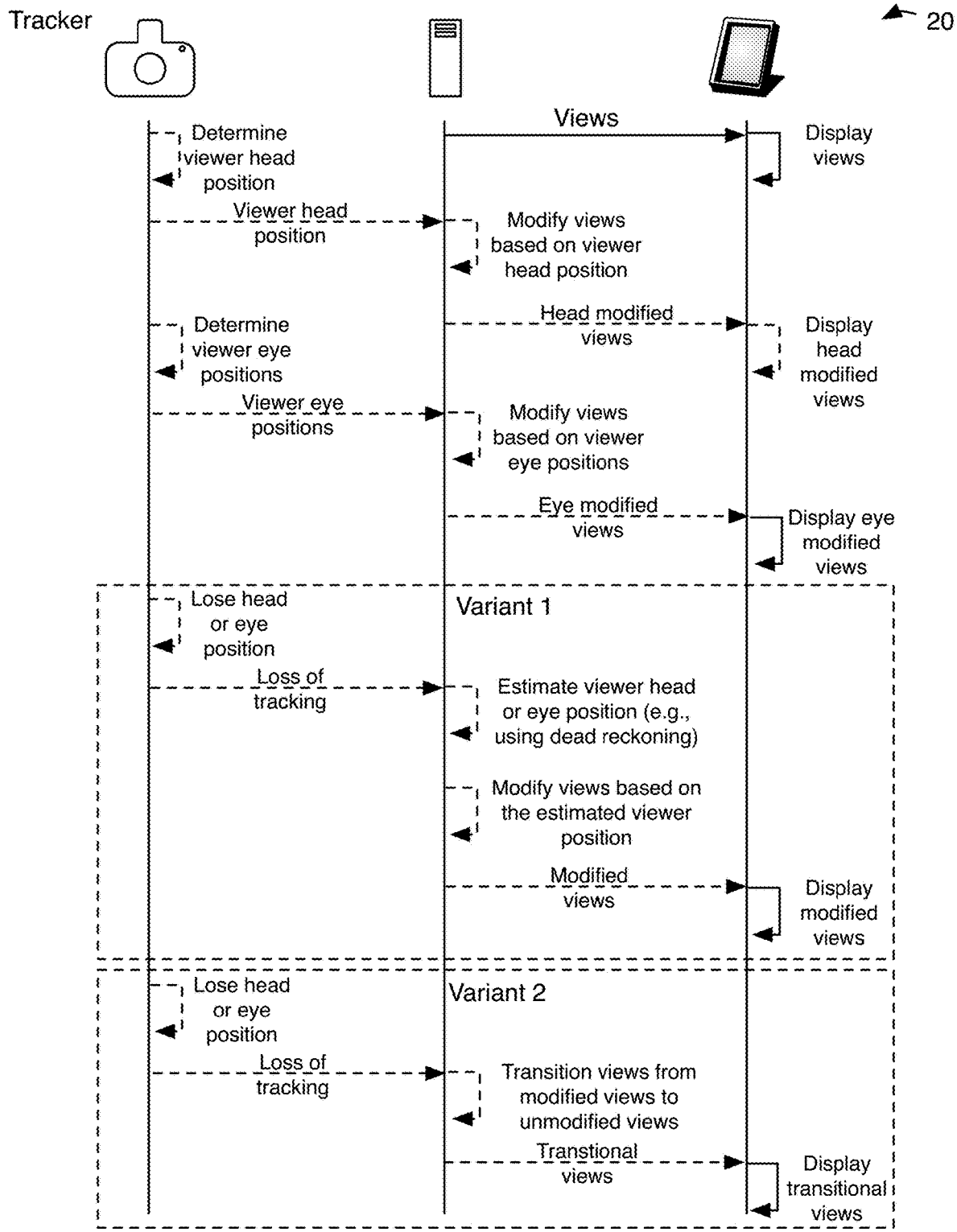
FIG. 16 is a schematic representation of an example of a method for operating a display.

In some variants, as shown for example in FIG. 16, determining the viewers' pose can be performed in multiple steps. These variants can be particularly, but not exclusively, beneficial as new viewers begin to be tracked and/or to recover tracking for a viewer after losing tracking. The multiple steps can include a course tracking step and a fine tracking step. In a specific example, a course tracking step can include determining (e.g., identifying) a gross feature of a viewer such as a viewer's head, body, face, and/or other feature. A fine tracking step can use the course tracking step, for example to narrow a search region, to track a subset of the gross viewer feature such as a viewer's eyes. However, determining the viewers' pose can be performed in a single step (e.g., lock onto viewers' eyes without performing an intermediate tracking step), and/or in any suitable steps or manner.

In some embodiments, when one or more viewers' lose tracking (but are still expected or known to be viewing the display), a viewer pose can be estimated. For example, the viewer pose can be estimated using dead reckoning and/or any suitable estimation method. The viewer pose can be estimated until viewer tracking is redetermined (e.g., sensor can identify a viewer feature or pose), for a predetermined amount of time (e.g., 1 s, 2 s, 4 s, 6 s, 10 s, 20 s, values therebetween, >20 s, <1 s, etc.), and/or until any suitable condition is met. After a predetermined duration of estimating the viewer pose for one or more viewers, the views are preferably (smoothly) transitioned from tracked views to untracked views, but can otherwise be processed.

Determining the operation settings S300, functions to determine the display settings for operating the device. S300 can be performed by the computing system (e.g., a configuration module of the computing system) and/or by any suitable component. S300 is preferably performed after S200, but can be performed at the same time as and/or before S200. However, the operation settings can be predetermined, preset, default values, and/or be otherwise set. The operation settings can be determined for the current operation (e.g., the current display iteration) and/or a future operation (e.g., a future display iteration).

The display settings can include: color (e.g., RGB, black and white, etc.), intensity, saturation, power consumption, mode of operation (e.g., bounded viewer, unbounded viewer, tracked mode, untracked mode, etc.), resolution (e.g. number of pixels per view), and/or any suitable settings. The display settings and/or view settings can be determined automatically and/or manually (e.g., in response to a viewer input such as at a user interface device). The display settings can be determined based on: the number of viewers, the viewer pose, viewer motion, vertical parallax (e.g., height difference between viewers, vertical distance between the display and viewer(s), etc.), tracking latency, display refresh rate, transition between modes (e.g., to facilitate a smooth transition), based on a conflict (e.g., based on an anticipated and/or detected conflict between viewer) and/or based on any suitable parameter.

When new viewers are detected (and/or as viewers leave), the operation settings preferably default to the settings for existing (and/or current) viewers before transitioning to accommodate new viewers. The transition is preferably gradual (e.g., occurring over a time period matching 1, 2, 5, 10, 20, 30, 40, 50, 100, 200, 500, 1000, values therebetween, etc. display refresh cycles; over a time period of at least 1 s, 2 s, 5 s, 10 s, 30 s, 60 s, etc.; etc.) but can occur substantially instantly (e.g., within less than 10 display refresh cycles, within less than 1 s, etc.) and/or with any suitable timing. However, the operation settings can remain the same when new viewers are detected (and/or viewers leave).

In an illustrative example, when a viewer is detected within a tracking distance of the display, the display can transition from an untracked mode to a tracked mode. In a second illustrative example, when a number of detected viewers exceeds a threshold number of viewers (e.g., more than 1 viewer, more than 2 viewers, more than 3 viewers, more than 5 viewers, more than 10 viewers, etc.), the display can transition from a tracked mode to an untracked mode. However, the display settings can otherwise be determined.

Generating the views S400 functions to create a set of views to display to viewers. S400 can additionally and/or alternatively decrease distortions and/or artifacts perceived by viewers and/or otherwise function. The set of views are preferably generated based on the operation settings (e.g., as determined in S300), but can be generated independent of the operation settings. S400 is preferably performed by a computing system (e.g., a view module of the computing system), but can be generated by any suitable component. S400 is preferably performed after S300, but can be performed before and/or during S300. The views can be prerendered (e.g., rendered before being displayed) and/or rendered in real-time (e.g., be generated immediately before being displayed). In some variants, the views can be updated (e.g., processed as described below) based on the operation settings (or changes thereof) and/or the viewer pose (e.g., the measured viewer pose, the estimate or predicted viewer pose, etc.).

View settings can include: number of views (e.g., to render, to display, etc.), types of views (e.g., image based, ray based, etc.), view perspective, and/or any suitable settings. The view settings can be determined based on: the number of viewers, the viewer pose (e.g., eye positions, eye orientations, etc.), viewer motion, vertical parallax (e.g., height difference between viewers, vertical distance between the display and viewer(s), etc.), tracking latency, display refresh rate, transition between modes (e.g., to facilitate a smooth transition), based on a conflict (e.g., based on an anticipated and/or detected conflict between viewer), a display mode, and/or based on any suitable parameter or viewer preference.

S400 preferably determines only the views that will be displayed. However, S400 can generate any suitable set or subset of views. The set of displayed views can correspond to: a predetermined number of views per eye of each viewer (e.g., 1, 2, 3, 5, 10, etc. views per eye), buffer views (e.g., buffer views for each viewer), the set of views, views corresponding to anticipated viewer(s), and/or any suitable views. In a first specific example, 2 views can be generated to be displayed to each viewer (e.g., a view corresponding to a left eye and a right eye of each viewer). In a second specific example, 4-8 views can be generated to be displayed to each viewer (e.g., buffer views to accommodate viewer motion, a plurality of views to each eye of each viewer). However, any suitable number of display views can be generated.

Generating the views S400 preferably includes selecting the views (e.g., based on the measured viewer position), but can alternatively include dynamically determining the views and/or otherwise determining the views. Each selected view can be: a view identifier (e.g., single image within an image array, wherein the image array is associated with a viewer position), an image depicting a scene from a specific perspective, and/or include other information. In one example, each potential viewer position is assigned a set of viewable and/or unviewable views (e.g., view identifiers, scene images), wherein the set of viewable and/or unviewable views can be selected for display or exclusion based on the measured viewer position. In a second example, the views are dynamically determined by moving a virtual camera to a virtual position corresponding to the measured viewer position within the virtual scene, wherein the views sampled by the virtual camera are displayed.

In a first example, a set of views can be predetermined for each of a set of potential viewing poses (e.g., viewing locations, possible locations of a viewer's eyes, possible viewer eye vectors, etc.), wherein the closest set of views corresponding to the measured viewing pose is selected for display. In a second example, the displayed set of views can be dynamically determined, wherein a virtual camera is moved to a virtual position corresponding to the measured viewing pose to capture the views for display. In a third example, the displayed set of views can be dynamically determined, wherein a camera can be moved to a position corresponding to the measured viewing pose to capture the views for display. However, the set of views can be captured at any other time.

Figure 13:
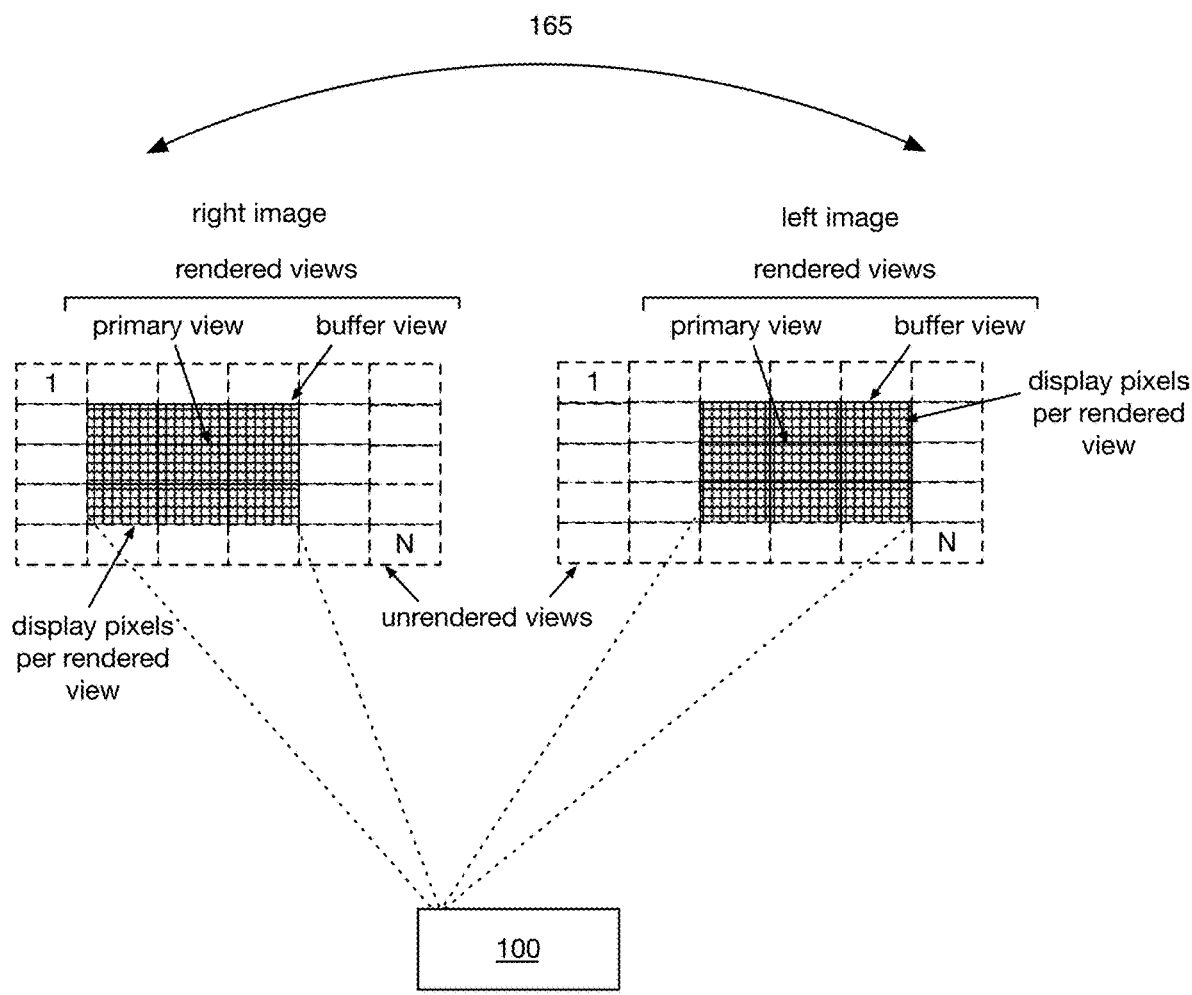
FIG. 13 is a schematic representation of an example of display pixel subsets aligned to specific views to be projected to a viewer.

S400 preferably includes determining an alignment of views relative to the pixel grid and/or display (e.g., as shown for example in FIG. 13). The alignment of views is preferably determined based on the display calibration, but can otherwise be determined. Aligning the views to the display is sometimes referred to as lenticularization of the views. For example, the alignment of the views can be shifted relative to the parallax generator to steer the direction that views are sent.

In some embodiments, the display calibration can be determined based on the viewer position (e.g., distance from the display). In a first variant, the calibration parameters can be associated with a coefficient that modifies the calibration parameters to a value that matches the distance between the user and the display. The coefficient can be based on a fit, a model, an equation, and/or determined in any suitable manner. In a second variant, the calibration parameters can be determined by interpolating between and/or extrapolating from a set of measured calibration parameters (e.g., a set of calibration parameters measured at specific calibration distances, an orthographic calibration parameter and a convergent calibration parameter, etc.) to determine the calibration parameters corresponding to the viewer position. However, the calibration parameters can be fixed and/or otherwise be determined based on the viewer(s)' poses.

In some variants particularly when viewers are tracked (e.g., in a tracking mode), S400 can include modifying the views based on the viewer position (e.g., based on gaze tracking information). The views can be modified so that one or more objects within the views appears to follow and/or track a viewer (e.g., a primary viewer such as a viewer interacting with the display, a closest viewer, each viewer, etc.), so that one or more objects is changed based on a viewer interaction, and/or otherwise be modified. In an illustrative example, the views can be updated such that a character and/or individual within a lightfield image appears to maintain eye contact with the viewer (e.g., eye contact is maintained as the viewer moves and/or the viewers gaze shifts). In a second illustrative example, the views can be updated (e.g., rendered) from a different perspective to (at least partially) accommodate the vertical parallax of a viewer (e.g., based on a height of the viewer, based on a height difference between the viewer and the display, etc.). However, the views can be modified in any manner.

S400 can optionally include storing the generated views. The views can be stored in a photoset, a quilt image (e.g., an image include the set of views arranged based on the view index such as in a raster format), a look-up table (e.g., a look-up table including the set of all rays generated by the scene), and/or in any suitable format.

In a first embodiment, generating the views can include capturing a set of virtual images of a virtual scene. This is preferably used when each view corresponds to an image (e.g., a virtual image), but can be used for other view formats. The set of virtual images are preferably captured by a set of virtual cameras (e.g., simulated cameras that function like a real camera). The number of virtual cameras preferably matches the number of views (e.g., number of displayed views), but the number of virtual cameras can be greater than and/or less than the number of views. The set of virtual cameras can be located (e.g., within the virtual scene) at the equivalent location to a viewer's eyes (e.g., as if the viewers were in the scene), based on the operation settings, at a depth from the scene matching the viewers distance (and/or the average distance of the viewers) from the display, at a predetermined distance from the scene (e.g. based on the calibration parameters, based on a focal length of the camera, based on a field of view of the camera, a calibration distance, etc.), and/or at any suitable location. In this embodiment, the fundamental or essential matrix of the virtual cameras can be fixed (particularly but not exclusively in an untracked mode) and/or variable (particularly but not exclusively in a tracked mode). For example, an essential or fundamental matrix for a virtual camera can be updated based on a viewers' pose, which can enable views to be generated that accommodate a viewer's pose.

In a variant of the first embodiment, generating the views can include retrieving a set of images (e.g., real images, virtual images) of a scene, such as from a storage module of a computing system. In this variant, the set of images can be interpolated and/or extrapolated from to accommodate a viewers' poses (e.g., based on the pose for camera(s) that were used to capture the set of images).

In a second embodiment, generating the views can include generating a virtual model of the display environment (e.g., a virtual model that includes the display, the scene to be displayed on the display, and, optionally, the viewer(s)) and tracing a set of rays corresponding to the light flowing in any direction through space (e.g., a plenoptic function of the virtual model). This is preferably used when each view corresponds to a light field (e.g., a set of rays), but can be used for other view formats. The virtual model is preferably generated based on the determined viewer poses (e.g., as determined in S200), but can be generated based on any suitable information. The virtual model can be generated by a physical shader and/or any suitable program. The virtual model can be a represented using voxel, polygons, contours, points, depths, meshes, convex hulls, and/or be represented in any way. The set of rays are preferably generated by ray tracing within the virtual environment, but can be generated according to any suitable optical modelling in the virtual environment.

In a variant of the second embodiment, the set of rays can be generated by mapping the views to be perceived by the viewer to pixels of the display, where the set of rays correspond to what the viewer would be expected to perceive if they were present in the scene represented by the views or holographic image).

However, a set of rays can additionally or alternatively be determined according to the first embodiment and/or in any manner.

Generating the views can include processing the views. The views are preferably processed based on the viewers' poses, but can be processed based on any suitable information. The views are preferably processed when the display is operated in a tracked mode, but can be processed when the display is operated in any suitable mode(s). As shown for example in FIG. 17, processing the views can include duplicating views, removing one or more views, adjusting a vertical perspective of the views, and/or any suitable steps.

The views are preferably processed in a manner that smoothly changes the views, but can be processed in an abrupt manner. For example, the views are preferably changed over several display refresh periods (e.g., over a time period of 1 s, 5 s, 10 s, 30 s, etc.; over several iterations; etc.). During each display refresh period, the views can be incrementally processed until after a predetermined number of cycles the views have transitioned to a target processed view. In a first illustrative example, if a target processed view differs from an existing view by 20° (e.g., to accommodate for vertical parallax; in an azimuthal, zenith, altitude, elevation, or other reference axis; etc.), the view could incrementally change (e.g., by 0.1°, 0.5°, 1°, 2°, 3°, 5°, 10°, etc.) for each (or every predetermined number of) display refreshes until the view achieved that target angular perspective. In a second illustrative example, when as a subset of the views are no longer displayed and/or are transitioning to be displayed, one view (e.g., a single view, one view from each direction, etc.) can be introduced or removed for each (or every predetermined number of) display refreshes. In an illustrative example, a transition frame (e.g., such as a monochromatic image such as white, blue, red, green, or other color etc.; a frame lasting less than a threshold amount of time such as less than 0.1 s, 0.25 s, 0.5 s, is, etc.; etc.) can be presented to break the visual continuity and/or to transition between modes. However, the views can be processed instantly (e.g., over a single display refresh cycle) and/or at any suitable timing.

S400 preferably transitions between views associated with a prior mode and a current mode (e.g., when transitioning from a tracking mode to a freespace or unbounded mode or vice versa), but can additionally or alternatively transition between views associated with a prior viewer position and views associated with a current viewer position, between a current and future (or predicted) mode, transition between modes associated with a prior number of viewers and a current number of viewers, and/or between any set of views. The transition parameters (e.g., speed, degrees changed, display refresh speed, etc.) can be: predetermined, determined based on the distance between the prior and current viewer position, determined based on the current and prior modes, and/or otherwise determined.

By smoothly transitioning the views, the viewer(s) preferably do not perceive a change between display modes (and/or when they move their head relative to the display). However, the transition or processing of the views can allow or enable the viewer(s) to perceive a change between display modes.

In a first example, when viewers with different fields of view and/or vertical parallax (such as from depth differences and/or height differences between viewers) are detected (and/or anticipated to occur), the view perspective can be changed to accommodate for the vertical parallax for one or more viewers. For example, a fundamental or essential matrix of a virtual camera can be changed such that the virtual camera captures a view of the scene from approximately the height of the viewer. In one variation, when a display operation transitions from a tracked mode to an untracked mode, the view perspective can be changed to a default vertical perspective. In a second variation, particularly to accommodate for more than one viewer (e.g., tracked viewer), the view perspective can be changed to a mean vertical perspective (e.g., average vertical perspective between viewers). In a third variation, each view perceived by a given viewer can be modified to accommodate the height (e.g., vertical perspective) of the given viewer (e.g., each viewer can perceive the holographic image from different perspectives at the same time).

In a second example, the views can be processed to improve a resolution (perceived or actual) of the holographic image. In a first variant, a clarity (e.g., a perceived resolution) can be improved by blanking or removing views that are not perceived by a viewer. For instance, if a viewer is in a position where they would perceive views 5 and 7, the remaining views (i.e., views 1-4, 6, and 8-N) can not be generated (e.g., be blank views, be black pixels, correspond to display pixels that are not activated, etc.). The first variant can be particularly beneficial for removing ghosting of views (e.g., the perception of views when the view is in positions other than the primary position that the views are expected to be perceived, cross talk between views). In a third variant, a resolution (e.g., a perceived resolution) can be improved by removing views that would be associated with positions between a viewer's eyes. For instance, if view 8 is associated with a viewer's left eye and view 3 is associated with a viewer's right eye, then one or more of views 4-7 can be removed from the set of views (e.g., blanked, not displayed, be black, have inactivated pixels, etc.). The second variant can be particularly beneficial for improving a resolution relative to a native resolution experienced by view smearing (e.g., a spatial extent of the views overlapping other views). In a third variant, a resolution (e.g., a perceived resolution) can be improved by duplicating each view associated with a viewer's eye position. For instance, if a viewer's left eye is associated with views 6, 7, and 8; view 7 can be duplicated in views 6 and 8 (similarly for views associated with the viewer's right eye). By duplicating the views, the perceived brightness of the views can be increased which can be particularly beneficial to account for (e.g., decrease a perception of) smearing of views that are not intended to be perceived (e.g., without sacrificing the brightness of the lightfield image or views thereof by darkening pixels that would have been seen by a viewer). However, one or more pixels can be darkened (e.g., views 6 and 8 in the above example can be darkened). In a fourth variant, a resolution (e.g., actual resolution) of the holographic image can be improved by changing the lenticular array (e.g., focal length, alignment, etc.) and processing the views based on the change to the lenticular array (e.g., by aligning the views to the changed lenticular array). For instance, a spatial light modulator (e.g., liquid crystal modulator, acousto-optic modulator, mechanically deformable modulation, etc.) can be used as or in addition to the lenticular array to enable more display pixels to be used for a given view (e.g., views associated with a viewer's eyes) and transmitted to the viewer. However, the views can otherwise be processed to enhance a resolution of the holographic image.

In a third example, when a viewer motion (or expected viewer motion such as predicted based on the sensor readings and a computing system) exceeds a threshold motion (e.g., a motion threshold based on a sensor latency), the number of views that are displayed (and/or rendered) within a viewcone can be increased. The additional views can buffer the displayed views to ensure that the viewer does not experience (sharp) discontinuities in the perception of the holographic image. For instance, if a viewer is in a position that they would see views 5 and 9, views 4, 6, 8, and 10 can additionally be presented to accommodate the viewer motion and ensure that the viewer continuously perceives a holographic image. However, viewer motion can otherwise be accommodated for.

Figure 12:
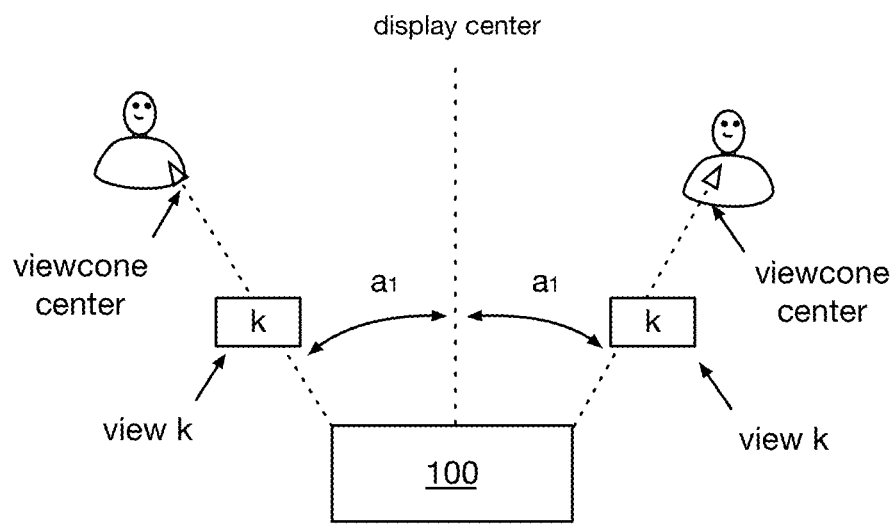
FIG. 12 is a schematic representation of an example of dynamic view adjustment.
Figure 12:
Figure 12:
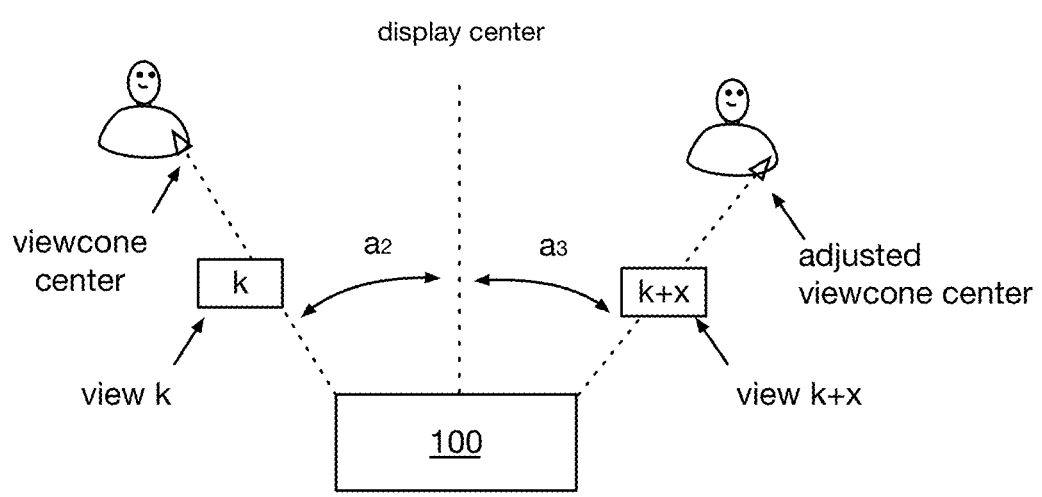

In a fourth example (example shown in FIG. 12), when two (or more) viewers are both in a position that would correspond to the same view, the view alignment relative to the lenticular array (and/or the viewcone center) can be shifted so that the users' position no longer correspond to the same view. For example, the calibration of the display (such as the center) can be adjusted to change the view alignment to the display. In this example, the view alignment can be shifted by an integer amount or a noninteger amount. In a variation of this specific example, each viewer can be associated with a different adjustment parameter (e.g., to facilitate an optimal or enhanced viewing experience for each viewer). This variation and example can apply even if the viewers are not in a position that would correspond to the same view. However, the view alignment can otherwise be adjusted.

In a fifth specific example, an aspect ratio of one or more views can be adjusted, which can be particularly beneficial when a distance between the viewer and the display changes (e.g., viewer moves closer to or further from the display).

However, the set of views can otherwise be processed.

However, the views can be generated in any suitable manner.

Displaying the views S500 functions to display a set of views to one or more users. S500 is preferably performed by a display, but can be performed by any suitable component. The display is preferably operated based on the operation settings (e.g., as determine in S300), but can be operated based on any suitable settings. The display preferably displays the set of views (e.g., the set of displayed views) generated in S400, but can display any suitable views. For example, each display pixel can display the pixel(s) of each generated view that is assigned to the respective pixel. In a second example, display pixels associated with views associated with a viewer can be activated (e.g., where other display pixels can remain dark or inactivated). S500 is preferably performed after S400, but can be performed before and/or during S400. The views are preferably perceived as a three-dimensional image (e.g., holographic image) by the viewers, but can be perceived as a two-dimension image and/or otherwise be perceived. The holographic image is preferably perceived without the viewers wearing or using a peripheral (e.g., headset, googles, glasses, etc.), but can additionally or alternatively the holographic image can be perceived using a peripheral.

S500 can optionally include interacting with the views, which functions to enable one or more viewers to interact with the views (e.g., displayed views). The views are preferably interacted with based on inputs to the user interface, but can be based on inputs to the computing system and/or any suitable inputs. Interacting with the views can include marking the views, modifying the views, scaling the views, rotating the views, and/or any suitable modification to the views (and/or scene).

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:
    a display configured to project a plurality of views as a three-dimensional image, comprising
        a light source;
        a lenticular lens optically coupled to the light source that, with the light source, generates a light output having viewing angle dependency; and
        an optical volume optically coupled to the lenticular lens, wherein the light source transmits the light output to the optical volume; wherein the optical volume transmits the light output to free-space; and
    a tracking sensor proximal the display configured to determine a pose of one or more viewers;
    wherein the plurality of views are modified based on the pose of the one or more viewers when a number of viewers is at most a threshold number of viewers; and wherein the plurality of views are not modified based on the pose of the one or more viewers when the number of viewers is greater than the threshold number, when more than one view of the plurality of views is associated with an eye of a viewer, each of the more than one view associated with the eye position of the viewer is modified to be the same view;
    wherein when the display operates in a tracked mode, a processor connected to the display is configured to:
        determine a viewer pose of a viewer of the display;
        modify a view of the plurality of views based on the viewer pose; and
        align the plurality of views to the display based on a calibration of the display, wherein the display projects the aligned views;
    wherein when the display operates in an untracked mode, the processor is configured to:
        align the plurality of views to the display based on the calibration of the display, wherein the display projects the aligned views.

2. The system of claim 1, wherein the tracking sensor comprises a camera, wherein an image acquired using the camera is used to determine the pose of the one or more viewers.

3. The system of claim 2, wherein the camera comprises a processor configured to determine at least one of an eye position or an eye vector of the one or more viewers from the image.

4. The system of claim 2, wherein the pose of the one or more viewers is determined when the one or more viewers are within a predetermined distance of the display.

5. The system of claim 1, wherein the plurality of views are modified to increase a resolution of the three-dimensional image.

6. The system of claim 5, wherein a subset of views not associated with a viewer pose are not displayed.

7. The system of claim 6, wherein the subset of views comprise views associated with a position between a left eye and a right eye of a viewer.

8. The system of claim 1, wherein a first subset of views associated with an eye position of a viewer are modified and wherein remaining views of the plurality of views are not modified.

9. The system of claim 1, wherein the display smoothly transitions between modifying the images and not modifying the images when the number of viewers decreases or increases relative to the threshold number.

10. The system of claim 9, wherein the smooth transition comprises transitioning between modifying and not modifying the views over at least ten display refresh cycles.

11. The system of claim 10, wherein the smooth transition defaults to existing or current viewers before accommodating a new viewer.

12. The system of claim 1, wherein the viewer pose comprises an eye position of the viewer, wherein determining a viewer pose comprises determining the eye position from an image of the viewer using image-based eye tracking.

13. The system of claim 1, wherein the processor is further configured to, when the viewer pose is lost, estimating the viewer pose using dead reckoning.

14. The system of claim 1, wherein the viewer pose is determined when the viewer is within a predetermined distance of the display.

15. The system of claim 14, wherein the display operates in the tracked mode when the viewer is within a second predetermined distance of the display, wherein the second predetermined distance is less than the predetermined distance.

16. The system of claim 1, wherein modifying the view comprises adjusting a perspective of the view based on a height difference between the viewer and the display.

17. The system of claim 1, wherein displaying the aligned views comprises only activating portions of the light source of the display associated with a subset of views of the plurality of views, wherein the subset of views are associated with the viewer pose.

18. The system of claim 1, wherein the plurality of views comprises between 20 and 150 distinct views.

19. The system of claim 1, wherein when the pose of two viewers corresponds to a single shared view, a view alignment relative to the lenticular lens is shifted such that the pose of the two viewers corresponds to unique views.

20. The system of claim 19, wherein each of the two viewers is associated with a different adjustment parameter.

21. The system of claim 19, wherein the view alignment relative to the lenticular lens is adjusted by changing a center calibration of the display.

* * * * *